United States Patent
Cuervo et al.

(10) Patent No.: US 12,473,266 B2
(45) Date of Patent: Nov. 18, 2025

(54) BENZOXAZOLE AND RELATED COMPOUNDS USEFUL AS CHAPERONE-MEDIATED AUTOPHAGY MODULATORS

(71) Applicant: Albert Einstein College of Medicine, Bronx, NY (US)

(72) Inventors: Ana Maria Cuervo, Bronx, NY (US); Evripidis Gavathiotis, Flushing, NY (US)

(73) Assignee: ALBERT EINSTEIN COLLEGE OF MEDICINE, Bronx, NY (US)

( * ) Notice: Subject to any disclaimer, the term of this patent is extended or adjusted under 35 U.S.C. 154(b) by 615 days.

(21) Appl. No.: 17/283,613

(22) PCT Filed: Oct. 10, 2019

(86) PCT No.: PCT/US2019/055493
§ 371 (c)(1),
(2) Date: Apr. 8, 2021

(87) PCT Pub. No.: WO2020/077024
PCT Pub. Date: Apr. 16, 2020

(65) Prior Publication Data
US 2021/0387953 A1    Dec. 16, 2021

Related U.S. Application Data

(60) Provisional application No. 62/743,920, filed on Oct. 10, 2018.

(51) Int. Cl.
C07D 263/57    (2006.01)
C07D 413/12    (2006.01)

(52) U.S. Cl.
CPC ......... *C07D 263/57* (2013.01); *C07D 413/12* (2013.01)

(58) Field of Classification Search
CPC ............................ C07D 263/57; C07D 413/12
See application file for complete search history.

(56) References Cited

U.S. PATENT DOCUMENTS

| | | | |
|---|---|---|---|
| 5,428,052 A | 6/1995 | Shroot et al. | |
| 8,273,743 B2 | 9/2012 | Koehler et al. | |
| 8,518,980 B2 | 8/2013 | Wynne et al. | |
| 8,895,313 B2 | 11/2014 | Kemp et al. | |
| 2014/0018320 A1* | 1/2014 | Wynne ................. | A61K 31/517 514/80 |
| 2015/0166492 A1 | 6/2015 | Cuervo et al. | |
| 2018/0179197 A1 | 6/2018 | Wu et al. | |
| 2019/0002450 A1 | 1/2019 | Tu et al. | |

FOREIGN PATENT DOCUMENTS

| | | |
|---|---|---|
| CN | 101420950 A | 4/2009 |
| GB | 1137033 A | 12/1968 |
| JP | 2011168515 A | 9/2011 |
| JP | 2018087173 A | 6/2018 |
| RU | 2008136371 A | 3/2010 |
| WO | 03048137 A1 | 11/2002 |
| WO | 03070830 A1 | 8/2003 |
| WO | 2006078283 A2 | 7/2006 |
| WO | 2007070173 A2 | 6/2007 |
| WO | 2007091106 A1 | 8/2007 |
| WO | 2008148867 A1 | 12/2008 |
| WO | 2009019504 A1 | 2/2009 |
| WO | 2017160116 A2 | 9/2017 |

OTHER PUBLICATIONS

Wang, CA Doc No. 101:211023, 1984, p. 1 (Year: 1984).*
CA Reg No. 312518-66-4, entered into STN Jan. 2, 2001, p. 1 (Year: 2001).*
CA Reg No. 752232-22-7, entered into STN on Sep. 27, 2004, p. 1-3 (Year: 2004).*
RN 1115890-50-0 Registry, Database Registry [Online] Retrieved from STN, Mar. 5, 2009, Date of Search: Aug. 14, 2023.
RN 1115950-78-1 Registry, Database Registry [Online] Retrieved from STN, Mar. 5, 2009, Search Date: Aug. 14, 2023.
RN 1116042-38-6 Registry, Database Registry [Online] Retrieved from STN, Mar. 5, 2009, Search Date: Aug. 14, 2023.
Extended European Search Report for European Application No. 19871950.2, Dated Jul. 4, 2022, 12 pages.
Feng Xun et al: "Aerobic Oxidation of Alcohols and the Synthesis of Benzoxazoles Catalyzed by a Cuprocupric Coordination Polymer (Cu+ -CP) Assisted by Tempo", Inorganic Chemistry, vol. 54, No. 5, Mar. 2, 2015 (Mar. 2, 2015), pp. 2088-2090, XP055811852.
Shekfeh Suhaib et al: "A multi-step virtual screening protocol for identification of novel non-acidic microsomal prostaglandin E2 synthase-1 (mPGES-1) inhibitors", Chemmedchem Communications, Dec. 11, 2018 (Dec. 11, 2018), XP055932726.

(Continued)

*Primary Examiner* — Adam C Milligan
*Assistant Examiner* — Karen Cheng
(74) *Attorney, Agent, or Firm* — CANTOR COLBURN LLP

(57) ABSTRACT

Compounds and pharmaceutically acceptable salts thereof of Formula I are disclosed. The variables, e.g. $R^1$-$R^9$, X, and Y are defined herein. Certain compounds and salts of Formula I are active as CMA modulators. The disclosure provides pharmaceutical compositions containing a compound of Formula I and methods of treating disorders responsive to CMA modulation.

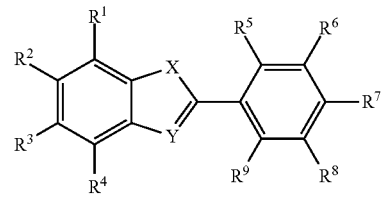

18 Claims, 1 Drawing Sheet

(56) References Cited

OTHER PUBLICATIONS

Suresh Dhanusu et al: "A green route for the synthesis of 2-substituted benzoxazole derivatives catalyzed by Al3+-exchanged K10 clay", Tetrahedron Letters, vol. 54, No. 48, pp. 6415-6419, XP028751809.
International Search Report Issued in International Application No. PCT/US2019/055493; International Filing Date: Oct. 10, 2019; Date of Mailing: Feb. 26, 2020; 5 Pages.
Pubmed Compound Summary for CID 142779; "2-(Biphenyl-4-yl)-1Hbenzimidazole"; U.S. National Library of Medicine; Retrieved Online from https://pubchem.ncbi.nlm.nih.gov/compound/142779; Jul. 8, 2005; 30 Pages.
Pubmed Compound Summary for CID 3517936; "2-Phenylbenzofuran"; U.S. National Library of Medicine; Retrieved Online from https://pubchem.ncbi.nlm.nih.gov/compound/3517936; Sep. 8, 2005; 53 Pages.
Pubmed Compound Summary for CID 53761958; "N-[4-(1H-Indol-2-yl)phenyl]formamide"; U.S. National Library of Medicine; Retrieved Online from https://pubchem.ncbi.nlm.nih.gov/compound/53761958; Dec. 4, 2011; 40 Pages.
Pubmed Compound Summary for CID 660707; "N-[4-(1-Benzofuran-2-yl)phenyl]acetamide"; U.S. National Library of Medicine; Retrieved Online from https://pubchem.ncbi.nlm.nih.gov/compound/660707; Jun. 29, 2005; 11 Pages.
Written Opinion Issued in International Application No. PCT/US2019/055493; International Filing Date: Oct. 10, 2019; Date of Mailing: Feb. 26, 2020; 7 Pages.
Kovačević et al., "Electrostatic and Topological Features as Predictors of Antifungal Potential of Oxazolo Derivatives as Promising Compounds in Treatment of Infections Caused by Candida albicans", Acta Chim. Slov., 65, pp. 483-491, Sep. 17, 2018.
Kurnik et al., "Potent a-Synuclein Aggregation Inhibitors, Identified by High-Throughput Screening, Mainly Target the Monomeric State", Cell Chemical Biology, 25(11), pp. 1389-1402, Nov. 15, 2018.
Ankenbruck et al.; "Small molecule inhibition of microRNA-21 expression reduces cell viability and microtumor formation"; Bioorganic & Medicinal Chemistry, vol. 27, Issue No. 16; pp. 3735-3743; DOI: 10.1016/j.bmc.2019.05.044 (2019).
CAS RN 330974-54-4 N-[4-(5-Chloro-2-benzoxazolyl)phenyl]-4-fluorobenzamide STN entry date Apr. 12, 2001, Retrieved from SciFinder.
CAS RN 347318-11-0 N-[4-(5-Chloro-2-benzoxazolyl)phenyl]propanamide STN entry date Jul. 22, 2001, Retrieved from SciFinder.
CAS RN 404831-80-7 N-[4-(5-Chloro-2-benzoxazolyl)phenyl]-2,2-dimethylpropanamide STN entry date Apr. 9, 2002, Retrieved from SciFinder.
CAS RN 461394-36-5 N-[4-(5-Chloro-2-benzoxazolyl)phenyl]hexanamide STN entry date Oct. 15, 2002, Retrieved from SciFinder.
CAS RN 462074-47-1 N-[4-(5-Chloro-2-benzoxazolyl)phenyl]-3-methylbutanamide STN entry date Oct. 17, 2002, Retrieved from SciFinder.
CAS RN 885994-49-0 3-Bromo-N-[4-(5-chloro-2-benzoxazolyl)phenyl]propanamide STN entry date May 30, 2006, Retrieved from SciFinder.
CAS RN 890978-64-0 N-[4-(5-Chloro-2-benzoxazolyl)phenyl]-2-methylpentanamide STN entry date Jul. 7, 2006, Retrieved from SciFinder.
CAS RN 891001-33-5 N-[4-(5-Chloro-2-benzoxazolyl)phenyl]-2-ethylbutanamide STN entry date Jul. 7, 2006, Retrieved from SciFinder.
CAS RN 901556-15-8 N-[4-(5-Chloro-2-benzoxazolyl)phenyl]butanamide STN entry date Aug. 15, 2006, Retrieved from SciFinder.
Mingzhen et al.; "2,5-Disubstituted benzoxazoles-2-(4-biphenyl)-5-substituted benzoxazoles"; Gaodeng Xuexiao Huaxue Xuebao, vol. 5, Issue No. 5; pp. 677-679 (1984).

* cited by examiner

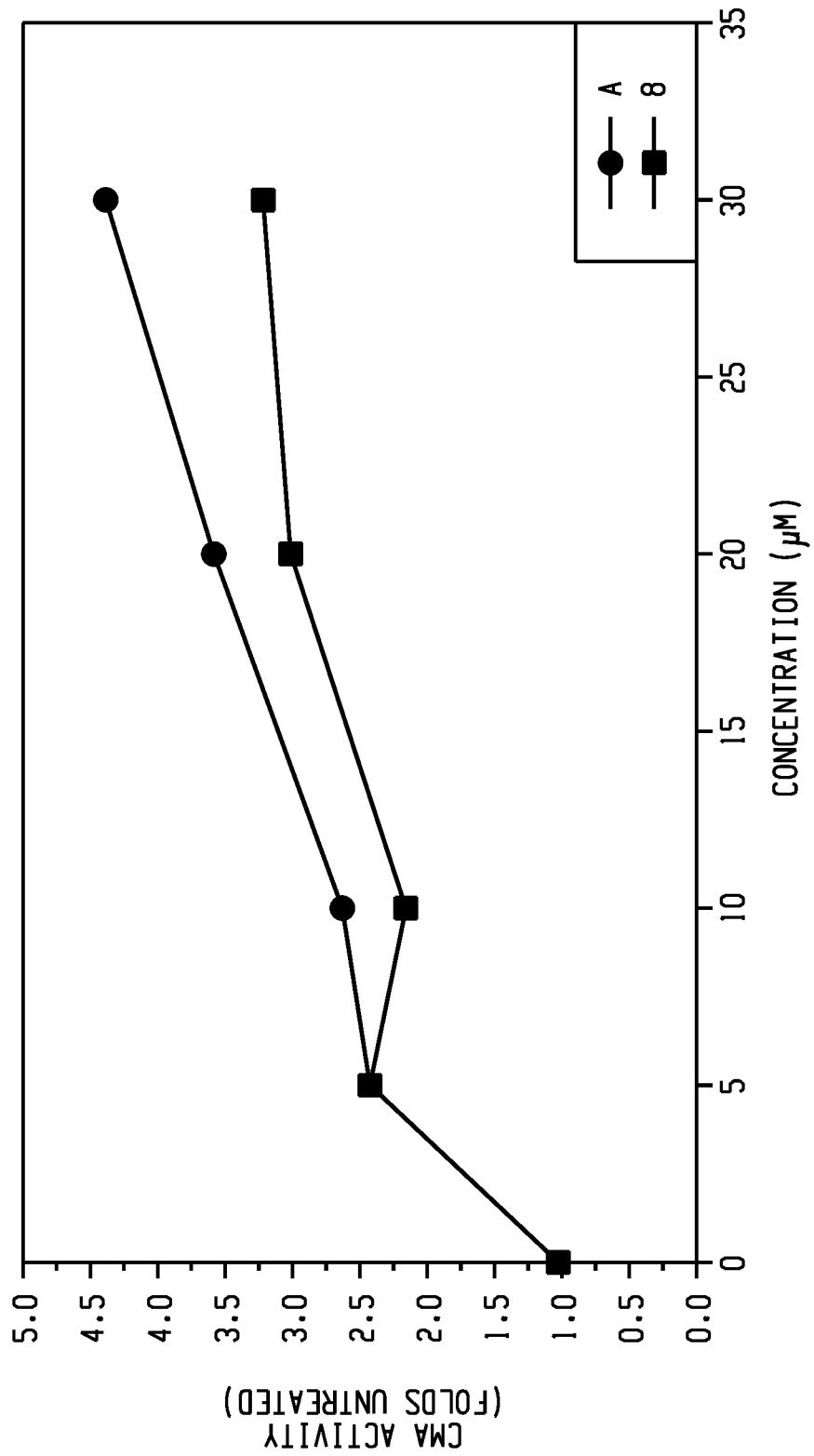

BENZOXAZOLE AND RELATED COMPOUNDS USEFUL AS CHAPERONE-MEDIATED AUTOPHAGY MODULATORS

CROSS REFERENCE TO RELATED APPLICATIONS

This application is a National Stage application of and claims priority to PCT/US19/55493, filed Oct. 10, 2019, which claims priority to U.S. Provisional Appl. No. 62/743,920, filed Oct. 10, 2018. Both the prior filings are hereby incorporated by reference in their entirety.

FIELD OF THE DISCLOSURE

The present disclosure relates to benzoxazoles and related compounds as CMA modulators and pharmaceutical compositions containing these compounds.

BACKGROUND

Autophagy is a process by which unnecessary or dysfunctional proteins present in the cytosol are degraded in lysosomal lumen. In chaperone-mediated autophagy (CMA), proteins are individually selected and targeted from the cytosol to the lysosomal lumen by directly crossing the membrane. CMA plays a role in cellular quality control by facilitating the removal of damaged or abnormal proteins and surplus subunits of multi-protein complexes. CMA, when activated, functions: to break down proteins to provide amino acids for fuel during prolonged periods of starvation; to remove oxidized proteins during oxidative stress; and to remove damaged proteins after toxic chemical exposure. CMA also has regulatory functions in the cell as it can modulate the activity of other cellular processes (i.e. glycolysis, lipogenesis, lipolysis, cell cycle, DNA repair, etc.) through degradation of key proteins that participate in each of these processes.

CMA is a multiple step process. The chaperone, heat shock cognate protein 70 (Hsc70), recognizes and binds a pentapeptide motif (e.g., KFERQ) of the protein substrate to be degraded. Once bound to Hsc70, the protein substrate is targeted to the surface of the lysosome where it interacts with the cytosolic tail of the monomeric form of the membrane-bound lysosome-associated membrane protein type 2A (LAMP-2A) receptor. Upon binding of the Hsc70-protein substrate complex to the LAMP-2 receptor, this triggers LAMP-2A to form a multimeric complex ("translocation complex") with the associated lysosomal proteins. It is only after the formation of the translocation complex that the protein substrate can cross the membrane from the cytosol to the lysosome. Once the substrate is translocated into the lysosomal lumen, LAMP-2A breaks away from the translocation complex and the protein substrate undergoes degradation.

Both diminished and enhanced CMA activity have been associated with human disease. In particular, problems in the functioning of the translocation complex contribute to the development of disease pathologies. For example, reduced CMA activity is associated with: neurodegenerative diseases, such as tauopathies (Frontotemporal Dementia, Alzheimer's disease), Parkinson's Disease, Huntington's Disease, prion diseases, amyotrophic lateral sclerosis, retinal and macular degeneration, leber congenital amaurosis, diabetes, acute liver failure, NASH, hepatosteatosis, alcoholic fatty liver, renal failure and chronic kidney disease, emphysema, sporadic inclusion body myositis, spinal cord injury, traumatic brain injury, lysosomal storage disorders, including but not limited to cystinosis, galactosialydosis, mucopolisacaridosis, a cardiovascular disease, or immunosenescence. Alternatively, upregulation of CMA activity is linked to the survival and proliferation of cancer cells and also occurs in Lupus, for example. However, known small molecules that modulate CMA are non-specific and affect the activity of other cellular quality control mechanisms. Therefore, there is a need for compounds that modulate CMA activity for the treatment of diseases and conditions associated with the increased or decreased CMA activity.

SUMMARY

The inventors have discovered a class of compounds and salts of Formula I that modulate CMA. Certain compounds of Formula I also modulate (either activate or inhibit) an RAR an RAR receptor.

Retinoic acid receptors (RARs) are nuclear hormone receptors that act as transcription factors, regulating cell division, cell growth and cell death. There are three types of RARs identified in mammals (RARα, RARβ, and RARγ) coded by different genes. The expression of RARβ and RARγ is tissue-dependent, whereas RARα is ubiquitously expressed. The natural ligands of RARs are all-trans retinoic acid (ATRA) and 9-cis retinoic acid (9-cis RA).

RARα signaling inhibits LAMP-2A transcription and the expression of other CMA genes. When RARα is activated upon binding of RARα agonists (e.g. ATRA, 9-cis RA or derivatives thereof), transcription of LAMP-2A decreases and there is less LAMP-2A receptor present to participate in CMA. Alternatively, an antagonist binding to RARα would potentially block the inhibition of the transcription of LAMP-2A, resulting in more LAMP-2A receptor present to participate in CMA.

The disclosure includes compound of Formula I

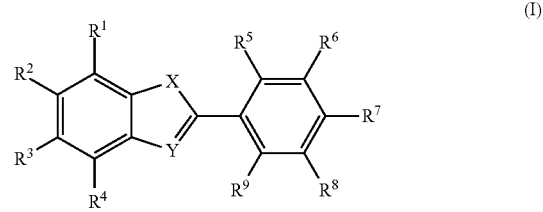

(I)

or a pharmaceutically acceptable salt thereof. Within Formula I the variables, e.g. $R^1$-$R^9$, X, and Y, carry the values set forth below.

X is O, C($R^{10}R^{11}$), C=O, N($R^{12}$), S, or S=O.

Y is C$R^{10}$ or N.

$R^1$, $R^2$, $R^3$, and $R^4$ are independently chosen from hydrogen, halogen, hydroxyl, $C_1$-$C_6$alkyl, and $C_1$-$C_6$alkoxy.

$R^5$, $R^6$, $R^8$, and $R^9$ are independently chosen from hydrogen, halogen, hydroxyl, $C_1$-$C_6$alkyl, and $C_1$-$C_6$alkoxy.

$R^7$ is —N$R^{20}$CO$R^{21}$ or —N$R^{20}$SO$_2R^{21}$, or $R^7$ is a phenyl, naphthyl, pyridyl, pyrimidinyl, pyrazinyl, thienyl, thiazolyl, imidazolyl, oxazolyl, triazolyl, quinolinyl, or isoquinolinyl group; each of which is optionally substituted with one or more substituents independently chosen from halogen, hydroxyl, cyano, —CHO, —COOH, amino, and $C_1$-$C_6$alkyl in which any carbon-carbon single bond is optionally replaced by a carbon-carbon double or triple bond, any methylene group is optionally replaced by O, S, or N$R^{22}$, and optionally substituted with one or more substituents independently chosen from halogen, hydroxyl, cyano, amino, and oxo; and each of which is optionally substituted with one substituent chosen from —N(R$^{20}$)COR$^{21}$ and —N(R$^{20}$)SO$_2$R$^{21}$.

R$^{10}$ and R$^{11}$ are independently chosen from hydrogen, halogen, hydroxyl, amino, cyano, C$_1$-C$_6$alkyl, C$_1$-C$_6$alkoxy, (C$_3$-C$_6$cycloalkyl)C$_0$-C$_2$alkyl, C$_1$-C$_2$haloalkyl, and C$_1$-C$_2$haloalkoxy.

R$^{12}$ is hydrogen, C$_1$-C$_6$alkyl, or (C$_3$-C$_6$cycloalkyl)C$_0$-C$_2$alkyl.

R$^{20}$ is hydrogen or C$_1$-C$_6$alkyl.

R$^{21}$ is independently chosen at each occurrence from hydrogen, C$_1$-C$_6$alkyl, C$_1$-C$_2$haloalkyl, monocyclic aryl and heteroaryl, each of which monocyclic aryl and heteroaryl is optionally substituted with one or more substituents independently chosen from halogen, hydroxyl, cyano, C$_1$-C$_6$alkyl, C$_1$-C$_6$alkoxy, C$_1$-C$_2$haloalkyl, and C$_1$-C$_2$haloalkoxy; and R$^{22}$ is hydrogen, C$_1$-C$_6$alkyl, or (C$_3$-C$_7$cycloalkyl)C$_0$-C$_2$alkyl; with the proviso that the compound is not N-(4-(6-chlorobenzo[d]oxazol-2-yl)phenyl) isobutyramide.

Pharmaceutical compositions comprising a compound or salt of Formula I together with a pharmaceutically acceptable carrier are disclosed.

The disclosure provides pharmaceutical compositions comprising a compound of Formula I, or a pharmaceutically acceptable salt of Formula I, together with a pharmaceutically acceptable carrier.

The disclosure further provides a method of selectively activating chaperone-mediated autophagy in a subject in need thereof by administering a therapeutically effective amount of a compound of Formula I, or salt thereof, to the subject. The disclosure provides the use of a compound of Formula I, or salt thereof, for activation of chaperone-mediated autophagy in a subject in need thereof.

BRIEF DESCRIPTION OF THE DRAWINGS

FIG. 1 shows the effect of Compound A and Compound 1 on CMA.

DETAILED DESCRIPTION

Chemical Description and Terminology

Prior to setting forth the invention in detail, it may be helpful to provide definitions of certain terms to be used in this disclosure. Compounds are described using standard nomenclature. Unless defined otherwise, all technical and scientific terms used herein have the same meaning as is commonly understood by one of skill in the art to which this invention belongs. Unless clearly contraindicated by the context each compound name includes the free acid or free base form of the compound as well as all pharmaceutically acceptable salts of the compound.

The term "compounds of Formula I" encompasses all compounds that satisfy Formula I, including any enantiomers, racemates and stereoisomers, as well as all pharmaceutically acceptable salts of such compounds. A dash ("—") that is not between two letters or symbols is used to indicate a point of attachment for a substituent.

The terms "a" and "an" do not denote a limitation of quantity, but rather denote the presence of at least one of the referenced item. The term "or" means "and/or". The open-ended transitional phrase "comprising" encompasses the intermediate transitional phrase "consisting essentially of" and the close-ended phrase "consisting of." Claims reciting one of these three transitional phrases, or with an alternate transitional phrase such as "containing" or "including" can be written with any other transitional phrase unless clearly precluded by the context or art. Recitation of ranges of values are merely intended to serve as a shorthand method of referring individually to each separate value falling within the range, unless otherwise indicated herein, and each separate value is incorporated into the specification as if it were individually recited herein. The endpoints of all ranges are included within the range and independently combinable. All methods described herein can be performed in any suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein. Unless defined otherwise, technical and scientific terms used herein have the same meaning as is commonly understood by one of skill in the art to which this invention belongs.

A dash ("—") that is not between two letters or symbols is used to indicate a point of attachment for a substituent. For example, —(C=O)OH is attached through carbon of the keto (C=O) group.

A bond represented by a combination of a solid and dashed line, i.e., =====, may be either a single or double bond.

"Alkyl" is a branched or straight chain or cyclic saturated aliphatic hydrocarbon group, having the specified number of carbon atoms, generally from 1 to about 8 carbon atoms. The term C$_1$-C$_6$alkyl as used herein indicates an alkyl group having from 1, 2, 3, 4, 5, or 6 carbon atoms. Other embodiments include alkyl groups having from 1 to 8 carbon atoms, 1 to 4 carbon atoms or 1 or 2 carbon atoms, e.g. C$_1$-C$_4$alkyl and C$_1$-C$_2$alkyl. When C$_0$-C$_n$ alkyl is used herein in conjunction with another group, for example, —C$_0$-C$_2$alkyl (phenyl), the indicated group, in this case phenyl, is either directly bound by a single covalent bond (C$_0$alkyl), or attached by an alkyl chain having the specified number of carbon atoms, in this case 1, 2, 3, or 4 carbon atoms. Alkyls can also be attached via other groups such as heteroatoms as in —O—C$_0$-C$_4$alkyl(C$_3$-C$_7$cycloalkyl). Examples of alkyl include, but are not limited to, methyl, ethyl, n-propyl, isopropyl, cyclopropyl, cyclopropylmethyl, cyclopropylethyl, n-butyl, cyclobutyl, 3-methylbutyl, t-butyl, cyclobutyl methyl. n-pentyl, and sec-pentyl.

"Alkoxy" is an alkyl group as defined above with the indicated number of carbon atoms covalently bound to the group it substitutes by an oxygen bridge (—O—). Examples of alkoxy include, but are not limited to, methoxy, ethoxy, n-propoxy, i-propoxy, cyclopropyloxy, cyclopropylmethoxy, n-butoxy, 2-butoxy, t-butoxy, n-pentoxy, 2-pentoxy, 3-pentoxy, isopentoxy, neopentoxy, n-hexoxy, 2-hexoxy, 3-hexoxy, and 3-methylpentoxy.

"Aryl" indicates aromatic groups containing only carbon in the aromatic ring or rings. Typical aryl groups contain 1 to 3 separate, fused, or pendant rings and from 6 to about 18 ring atoms, without heteroatoms as ring members. When indicated, such aryl groups may be further substituted with carbon or non-carbon atoms or groups. Aryl groups include, for example, phenyl, naphthyl, including 1-naphthyl, 2-naphthyl, and bi-phenyl.

"Cycloalkyl" is a saturated hydrocarbon ring group, having the specified number of carbon atoms. Monocyclic cycloalkyl groups typically have from 3 to about 7 (3, 4, 5, 6, or 7) carbon ring atoms. Cycloalkyl substituents may be pendant from a substituted nitrogen, sulfur, oxygen or carbon atom, or a substituted carbon atom that may have two substituents may have a cycloalkyl group, which is attached as a spiro group. Examples of cycloalkyl groups include cyclopropyl, cyclobutyl, cyclopentyl, or cyclohexyl as well as bridged or caged saturated ring groups such as norbornane or adamantine.

"Haloalkyl" includes both branched and straight-chain alkyl groups having the specified number of carbon atoms, substituted with 1 or more halogen atoms, up to the maximum allowable number of halogen atoms. Examples of haloalkyl include, but are not limited to, trifluoromethyl, difluoromethyl, 2-fluoroethyl, and pentafluoroethyl.

"Haloalkoxy" is a haloalkyl group as defined herein attached through an oxygen bridge (oxygen of an alcohol radical).

"Halo" or "halogen" indicates any of fluoro, chloro, bromo, and iodo.

"Heteroaryl" is a stable monocyclic aromatic ring having the indicated number of ring atoms which contains from 1 to 4, or in some embodiments from 1 to 2, heteroatoms chosen from N, O, and S, with remaining ring atoms being carbon, or a stable bicyclic system containing at least one 5- to 7-membered aromatic ring which contains from 1 to 4, or in some embodiments from 1 to 2, heteroatoms chosen from N, O, and S, with remaining ring atoms being carbon. Monocyclic heteroaryl groups typically have from 5 to 7 ring atoms. In certain embodiments the heteroaryl group is a 5- or 6-membered heteroaryl group having 1, 2, 3, or 4 heteroatoms chosen from N, O, and S, with no more than 2 O atoms and 1 S atom.

The term "substituted," as used herein, means that any one or more hydrogens on the designated atom or group is replaced with a selection from the indicated group, provided that the designated atom's normal valence is not exceeded. When the substituent is oxo (i.e., =O) then 2 hydrogens on the atom are replaced. When an oxo group substitutes aromatic moieties, the corresponding partially unsaturated ring replaces the aromatic ring. For example a pyridyl group substituted by oxo is a pyridone. Combinations of substituents and/or variables are permissible only if such combinations result in stable compounds or useful synthetic intermediates. A stable compound or stable structure is meant to imply a compound that is sufficiently robust to survive isolation from a reaction mixture, and subsequent formulation into an effective therapeutic agent. Unless otherwise specified substituents are named into the core structure. For example, it is to be understood that when aminoalkyl is listed as a possible substituent the point of attachment of this substituent to the core structure is in the alkyl portion.

In certain embodiments, groups that may be "substituted" or "optionally substituted" include, but are not limited to: monocyclic aryl, e.g., phenyl; monocyclic heteroaryl, e.g., pyrrolyl, pyrazolyl, thienyl, furanyl, imidazolyl, thiazolyl, triazolyl, pyridyl, pyrmidinyl; bicyclic heteroaryl, e.g., benzimidazolyl, imidazopyridizinyl, indolyl, indazolyl, quinolinyl, isoquinolinyl; and $C_1$-$C_6$alkyl in which any carbon-carbon single bond is optionally replaced by a carbon-carbon double or triple bond, any methylene group is optionally replaced by O, S, or $NR^2$.

Suitable groups that may be present on a "substituted" or "optionally substituted" position include, but are not limited to: halogen; cyano; CHO; COOH; hydroxyl; oxo; amino; alkyl groups from 1 to about 6 carbon atoms; alkoxy groups having one or more oxygen linkages and from 1 to about 8, or from 1 to about 6 carbon atoms; haloalkyl groups having one or more halogens and from 1 to about 8, from 1 to about 6, or from 1 to about 2 carbon atoms; and haloalkoxy groups having one or more oxygen linkages and one or more halogens and from 1 to about 8, from 1 to about 6, or from 1 to about 2 carbon atoms.

"Pharmaceutical compositions" are compositions comprising at least one active agent, such as a compound or salt of Formula I, and at least one other substance, such as a carrier. Pharmaceutical compositions optionally contain one or more additional active agents. When specified, pharmaceutical compositions meet the U.S. FDA's GMP (good manufacturing practice) standards for human or non-human drugs.

"Pharmaceutically acceptable salts" includes derivatives of the disclosed compounds in which the parent compound is modified by making inorganic and organic, non-toxic, acid or base addition salts thereof. The salts of the present compounds can be synthesized from a parent compound that contains a basic or acidic moiety by conventional chemical methods. Generally, such salts can be prepared by reacting free acid forms of these compounds with a stoichiometric amount of the appropriate base (such as Na, Ca, Mg, or K hydroxide, carbonate, bicarbonate, or the like), or by reacting free base forms of these compounds with a stoichiometric amount of the appropriate acid. Such reactions are typically carried out in water or in an organic solvent, or in a mixture of the two. Generally, non-aqueous media like ether, ethyl acetate, ethanol, isopropanol, or acetonitrile are preferred, where practicable. Salts of the present compounds further include solvates of the compounds and of the compound salts.

Examples of pharmaceutically acceptable salts include, but are not limited to, mineral or organic acid salts of basic residues such as amines; alkali or organic salts of acidic residues such as carboxylic acids; and the like. The pharmaceutically acceptable salts include the conventional non-toxic salts and the quaternary ammonium salts of the parent compound formed, for example, from non-toxic inorganic or organic acids. For example, conventional non-toxic acid salts include those derived from inorganic acids such as hydrochloric, hydrobromic, sulfuric, sulfamic, phosphoric, nitric and the like; and the salts prepared from organic acids such as acetic, propionic, succinic, glycolic, stearic, lactic, malic, tartaric, citric, ascorbic, pamoic, maleic, hydroxymaleic, phenylacetic, glutamic, benzoic, salicylic, mesylic, esylic, besylic, sulfanilic, 2-acetoxybenzoic, fumaric, toluenesulfonic, methanesulfonic, ethane disulfonic, oxalic, isethionic, HOOC—$(CH_2)_n$—COOH where n is 0-4, and the like.

The term "carrier" applied to pharmaceutical compositions/combinations of the present disclosure refers to a diluent, excipient, or vehicle with which an active compound is provided. To be pharmaceutically acceptable a carrier must be safe, non-toxic and neither biologically nor otherwise undesirable.

Chemical Description

The disclosure provides compounds and salts of Formula I. The term "Formula I" includes the pharmaceutically acceptable salts of Formula I unless the context clearly indicates otherwise. In certain situations, the compounds of Formula I may contain one or more asymmetric elements such as stereogenic centers, stereogenic axes and the like, e.g. asymmetric carbon atoms, so that the compounds can exist in different stereoisomeric forms. These compounds can be, for example, racemates or optically active forms. For compounds with two or more asymmetric elements, these compounds can additionally be mixtures of diastereomers.

For compounds having asymmetric centers, it should be understood that all of the optical isomers and mixtures thereof are encompassed. In addition, compounds with carbon-carbon double bonds may occur in Z- and E-forms, with all isomeric forms of the compounds being included in the present disclosure. In these situations, single enantiomers, i.e., optically active forms, can be obtained by asymmetric synthesis, synthesis from optically pure precursors, or by resolution of the racemates. Resolution of the racemates can also be accomplished, for example, by conventional methods such as crystallization in the presence of a resolving agent, or chromatography, using, for example using a chiral HPLC column.

Where a compound exists in various tautomeric forms, the invention is not limited to any one of the specific tautomers, but rather includes all tautomeric forms.

The present disclosure includes all isotopes of atoms occurring in the present compounds. Isotopes include those atoms having the same atomic number but different mass numbers. By way of general example, and without limitation, isotopes of hydrogen include tritium and deuterium and isotopes of carbon include $^{11}C$ $^{13}C$, and $^{14}C$.

The disclosure includes compounds and salts of Formula I in which the variables, e.g. X, Y, $R^1$, $R^2$, $R^3$, $R^4$, $R^5$, $R^6$, $R^7$, $R^8$, $R^9$, $R^{10}$, $R^{11}$, $R^{12}$, $R^{20}$, $R^{21}$, and $R^{22}$ carry any of the definitions set forth below. Any of the variable definitions set forth below can be combined with any other of the variable definitions so long as a stable compound results.

Formula I

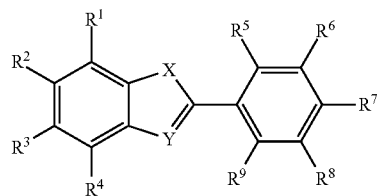

Compound A and Compound B are provided as comparative examples and are not within the scope of Formula I.

Compound A

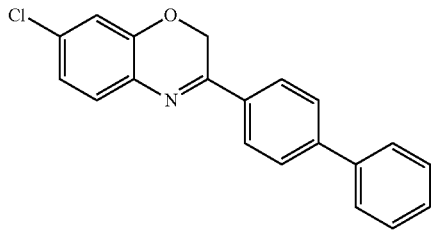

Compound B

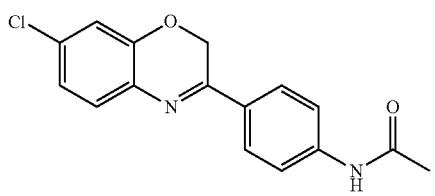

In addition to compounds and salts of Formula I the disclosure provides compounds and salts having any of the following subformulae:

I-A

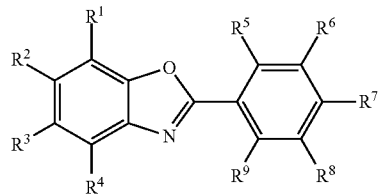

I-B

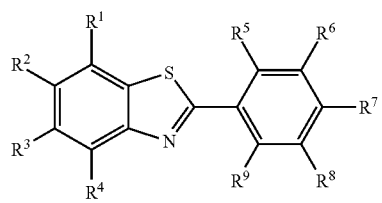

I-C

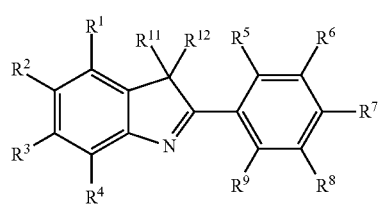

I-D

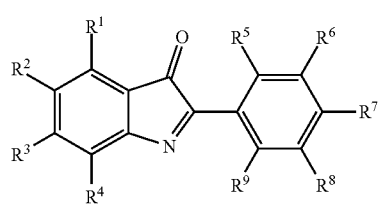

I-E

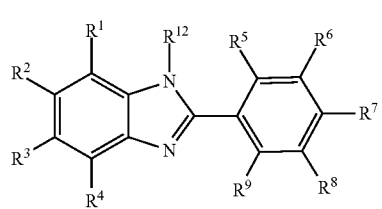

I-F

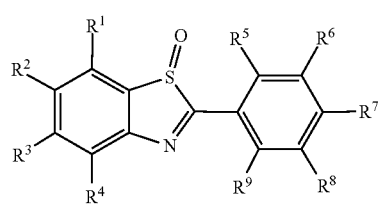

I-G

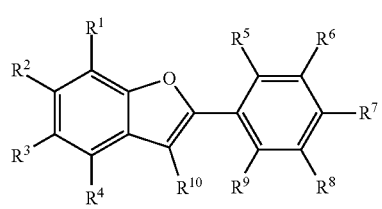

-continued

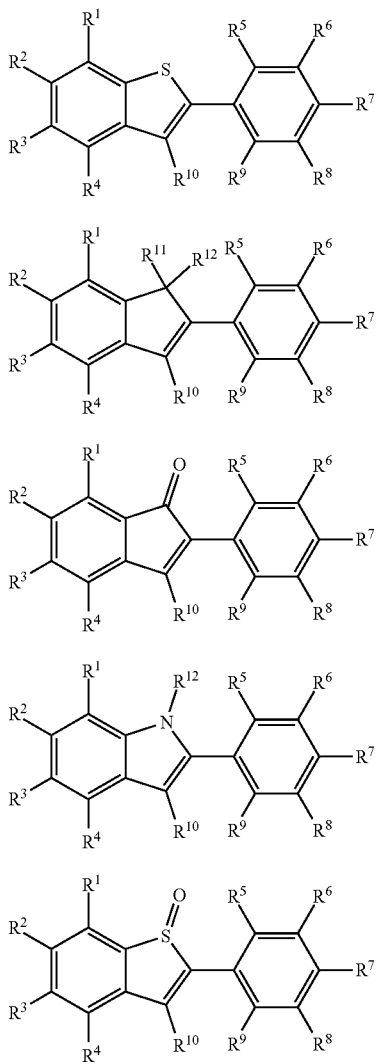

I-H

I-J

I-K

I-L

I-M

The R¹-R⁹ Variables (1) R¹, R³, and R⁴ are all hydrogen.
(2) R⁵, R⁶, R⁸, and R⁹ are all hydrogen.
(3) R¹, R³, R⁴ R⁵, R⁶, R⁸, and R⁹ are hydrogen.
(4) R¹, R², and R⁴ are all hydrogen and R³ is chloro.
(5) R² is chloro.
(6) R⁷ is —NR²⁰COR²¹ or —NR²⁰SO₂R²¹.
(7) R⁷ is a phenyl, naphthyl, pyridyl, pyrimidinyl, pyrazinyl, thienyl, thiazolyl, imidazolyl, oxazolyl, triazolyl, quinolinyl, or isoquinolinyl group; each of which is optionally substituted with halogen, hydroxyl, cyano, —CHO, —COOH, amino, and C₁-C₆alkyl in which any carbon-carbon single bond is optionally replaced by a carbon-carbon double or triple bond, any methylene group is optionally replaced by O, S, or NR²², and optionally substituted with one or more substituents independently chosen from halogen, hydroxyl, cyano, amino, and oxo; and optionally substituted with one substituent chosen from —N(R²⁰)COR²¹ and —N(R²⁰)SO₂R²¹.
(8) R⁷ is a phenyl, which is optionally substituted with one or more substituents independently chosen from halogen, hydroxyl, cyano, —CHO, —COOH, amino, and C₁-C₆alkyl in which any carbon-carbon single bond is optionally replaced by a carbon-carbon double or triple bond, any methylene group is optionally replaced by O, S, or NR²², and optionally substituted with one or more substituents independently chosen from halogen, hydroxyl, cyano, amino, and oxo; and optionally substituted with one substituent chosen from —N(R²⁰)COR²' and —N(R²⁰)SO₂R²¹.
(7) R⁷ is —NR²⁰COR²¹ or NR²⁰SO₂R²¹; R²⁰ is hydrogen or methyl; and R²¹ is C₁-C₆alkyl or CF₃.
(8) R⁷ is phenyl, optionally substituted with one or more substituents independently chosen from hydroxyl and C₁-C₂alkoxy.
(89) R⁷ is phenyl, optionally substituted with halogen, —NR²⁰COR²¹, or NR²⁰SO₂R²¹.
(10) R⁷ is 4-fluorophenyl.
(11) R⁷ is phenyl, optionally substituted with one or more substituents independently chosen from halogen, hydroxyl, C₁-C₄alkyl, C₁-C₄alkoxy, trifluoromethyl, and trifluormethoxy; and optionally substituted with one substituent chosen from —NR²⁰COR²¹ and —NR²⁰SO₂R²¹.
(11) R⁷ is —NR¹⁰COR¹¹.
(12) R⁷ is —NR¹⁰SO₂R¹¹.

R²⁰ and R²¹ Variables

In certain of the above embodiments R²⁰ and R²¹, when present, carry the following definitions.

In certain embodiments R²¹ is independently chosen at each occurrence from hydrogen, C₁-C₆alkyl, C₁-C₂haloalkyl, C₃-C₇cycloalkyl, phenyl and pyridyl, each of which phenyl and pyridyl is optionally substituted with one or more substituents independently chosen from halogen, hydroxyl, cyano, C₁-C₆alkyl, C₁-C₆alkoxy, C₁-C₂haloalkyl, and C₁-C₂haloalkoxy.

Particular Embodiments

The disclosure also includes compounds and salts of Formula I, and any of the subformulae thereof in which the variables carry the following combinations of definitions. Formula I-A and I-B are particular embodiments included in this disclosure (1) R¹, R³, R⁴ R⁵, R⁶, R⁸, and R⁹ are hydrogen;
R² is chloro;
R⁷ is phenyl, optionally substituted with one or more substituents independently chosen from halogen, hydroxyl, C₁-C₄alkyl, C₁-C₄alkoxy, trifluoromethyl, and trifluormethoxy; and optionally substituted with one substituent chosen from —NR²⁰COR²¹ and —NR²⁰SO₂R²¹;
R²⁰ is hydrogen or methyl; and
R²¹ is C₁-C₆alkyl or CF₃.
(2) R¹, R³, R⁴ R⁵, R⁶, R⁸, and R⁹ are hydrogen;
R² is chloro; and
R⁷ is phenyl, optionally substituted with one or more substituents independently chosen from hydroxyl, halogen, C₁-C₂haloalkyl, and C₁-C₂haloalkoxy.
(3) R¹, R³, R⁴ R⁵, R⁶, R⁸, and R⁹ are hydrogen;
R² is chloro;
R⁷ is phenyl substituted with one substituent chosen from —NR²⁰COR²¹ and —NR²⁰SO₂R²¹; and
R²⁰ is hydrogen; and R²¹ is chosen from C₁-C₆alkyl, or C₁-C₆haloalkyl.
(4) R¹, R³, R⁴ R⁵, R⁶, R⁸, and R⁹ are hydrogen;
R² is chloro;
R⁷ is —NR²⁰COR²¹ or —NR²⁰SO₂R²¹; and $R^{20}$ is hydrogen; and $R^{21}$ is chosen from $C_1$-$C_6$alkyl, $C_1$-$C_2$haloalkyl, and phenyl, each of which phenyl optionally substituted with one or more halogens.

(13) $R^{10}$ is independently chosen at each occurrence from hydrogen and $C_1$-$C_6$alkyl.
(14) $R^{10}$ is hydrogen or methyl.
(15) $R^{10}$ is hydrogen.
(16) $R^{11}$ is independently chosen at each occurrence from hydrogen, $C_1$-$C_6$alkyl, $C_1$-$C_2$haloalkyl, $C_3$-$C_7$cycloalkyl, monocyclic aryl and heteroaryl, each of which monocyclic aryl and heteroaryl is optionally substituted with one or more substituents independently chosen from halogen, hydroxyl, cyano, $C_1$-$C_6$alkyl, $C_1$-$C_6$alkoxy, $C_1$-$C_2$haloalkyl, and $C_1$-$C_2$haloalkoxy.
(17) $R^{11}$ is independently chosen at each occurrence from hydrogen, $C_1$-$C_6$alkyl, $C_1$-$C_2$haloalkyl, $C_3$-$C_7$cycloalkyl, phenyl and pyridyl, each of which phenyl and pyridyl is optionally substituted with one or more substituents independently chosen from halogen, hydroxyl, cyano, $C_1$-$C_6$alkyl, $C_1$-$C_6$alkoxy, $C_1$-$C_2$haloalkyl, and $C_1$-$C_2$haloalkoxy.
(18) $R^{11}$ is chosen from $C_1$-$C_6$alkyl, $C_1$-$C_2$haloalkyl, and phenyl, each of which phenyl optionally substituted with one or more halogens.
(19) $R^{11}$ is —$C_1$-$C_6$alkyl or —$CF_3$.
(20) $R^{11}$ is —$CH_3$, $CF_3$, —$CH(CH_3)_2$, —$(CH_2)_2CH_3$, or 4-fluorophenyl.
(21) $R^{12}$ is hydrogen, $C_1$-$C_6$alkyl, or $C_3$-$C_7$cycloalkyl.

In certain embodiments $R^7$ is chosen from one of the following groups:

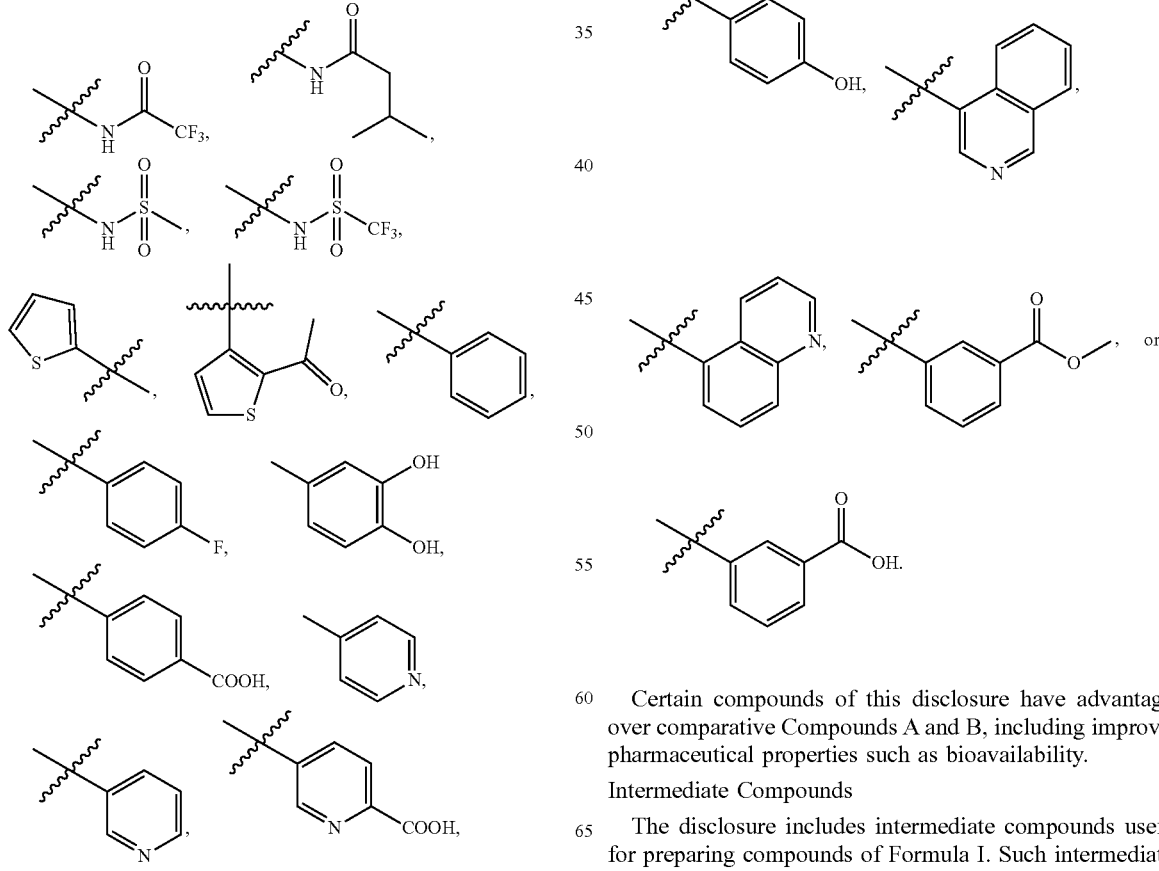

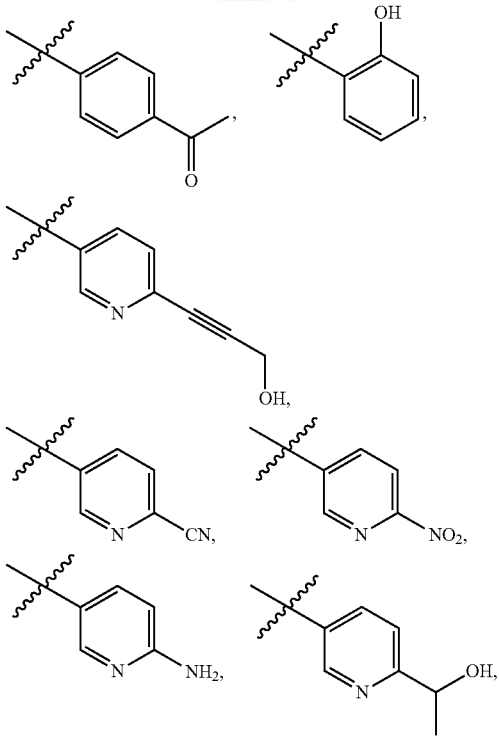

Certain compounds of this disclosure have advantages over comparative Compounds A and B, including improved pharmaceutical properties such as bioavailability.

Intermediate Compounds

The disclosure includes intermediate compounds useful for preparing compounds of Formula I. Such intermediates include compounds of Formula II

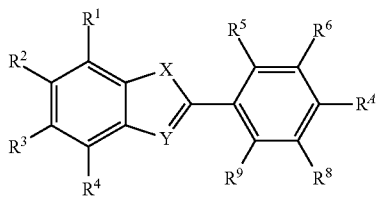

(II)

or a pharmaceutically acceptable salt thereof, wherein
X, Y, $R^1$-$R^6$ and $R^1$-$R^9$ carry any of the definitions set forth for compounds of Formula I and its subformulae, but are preferably hydrogen or $C_1$-$C_4$alkyl.

$R^A$ is amino or bromo; or $R^A$ is a phenyl, naphthyl, pyridyl, pyrimidinyl, pyrazinyl, thienyl, thiazolyl, imidazolyl, oxazolyl, triazolyl, quinolinyl, or isoquinolinyl group; each of which is substituted with one amino or bromo substituent.

Pharmaceutical Preparations

Compounds disclosed herein can be administered as the neat chemical, but are preferably administered as a pharmaceutical composition. Accordingly, the disclosure provides pharmaceutical compositions comprising a compound or pharmaceutically acceptable salt of a CMA modulator, such as a compound of Formula I, together with at least one pharmaceutically acceptable carrier. In certain embodiments the pharmaceutical composition is in a dosage form that contains from about 0.1 mg to about 2000 mg, from about 10 mg to about 1000 mg, from about 100 mg to about 800 mg, or from about 200 mg to about 600 mg of a compound of Formula I and optionally from about 0.1 mg to about 2000 mg, from about 10 mg to about 1000 mg, from about 100 mg to about 800 mg, or from about 200 mg to about 600 mg of an additional active agent in a unit dosage form.

Compounds disclosed herein may be administered orally, topically, parenterally, by inhalation or spray, sublingually, transdermally, via buccal administration, rectally, as an ophthalmic solution, through intravitreal injection or by other means, in dosage unit formulations containing conventional pharmaceutically acceptable carriers. The pharmaceutical composition may be formulated as any pharmaceutically useful form, e.g., as an aerosol, a cream, a gel, a pill, a capsule, a tablet, a syrup, a transdermal patch, or an ophthalmic solution for topical or intravitreal injection. Some dosage forms, such as tablets and capsules, are subdivided into suitably sized unit doses containing appropriate quantities of the active components, e.g., an effective amount to achieve the desired purpose.

Carriers include excipients and diluents and must be of sufficiently high purity and sufficiently low toxicity to render them suitable for administration to the patient being treated. The carrier can be inert or it can possess pharmaceutical benefits of its own. The amount of carrier employed in conjunction with the compound is sufficient to provide a practical quantity of material for administration per unit dose of the compound.

Classes of carriers include, but are not limited to binders, buffering agents, coloring agents, diluents, disintegrants, emulsifiers, flavorants, glidants, lubricants, preservatives, stabilizers, surfactants, tableting agents, and wetting agents. Some carriers may be listed in more than one class, for example vegetable oil may be used as a lubricant in some formulations and a diluent in others. Exemplary pharmaceutically acceptable carriers include sugars, starches, celluloses, powdered tragacanth, malt, gelatin; talc, and vegetable oils. Optional active agents may be included in a pharmaceutical composition, which do not substantially interfere with the activity of the compound of the present disclosure.

The pharmaceutical compositions/combinations can be formulated for oral administration. These compositions contain between 0.1 and 99 weight % (wt. %) of a compound of Formula I and usually at least about 5 wt. % of a compound of Formula I. Some embodiments contain from about 25 wt. % to about 50 wt. % or from about 5 wt. % to about 75 wt. % of the compound of Formula.

Methods of Treatment

The disclosure also provides methods of selectively activating chaperone-mediated autophagy (CMA) in a subject in need thereof comprising administering to the subject a compound of Formula I in an amount effective to activate CMA in the subject.

The subject can have, for example, a neurodegenerative disease, such as tauopathies, (Frontotemporal Dementia, Alzheimer's disease), Parkinson's Disease, Huntington's Disease, prion diseases, amyotrophic lateral sclerosis, retinal degeneration (dry or wet macular degeneration, retinitis pigmentosa, diabetic retinopathy, glaucoma, Leber congenital amaurosis), diabetes, acute liver failure, non-alcoholic steatobhpatitis (NASH), hepatosteatosis, alcoholic fatty liver, renal failure and chronic kidney disease, emphysema, sporadic inclusion body myositis, spinal cord injury, traumatic brain injury, fibrosis (liver, kidney, or lung), a lysosomal storage disorder, a cardiovascular disease, and immunosenescence. Lysosomal storage disorders include, but are not limited to, cystinosis, galactosialidosis, and mucolipidosis. The subject may also have a disease or condition in which CMA is upregulated such as cancer or Lupus. The subject can have reduced CMA compared to a normal subject prior to administering the compound. Preferably, the compound does not affect macroautophagy or other autophagic pathways. In macroautophagy, proteins and organelles are sequestered in double-membrane vesicles and delivered to lysosomes for degradation. In CMA, protein substrates are selectively identified and targeted to the lysosome via interactions with a cytosolic chaperone and cross the lysosomal membrane through a translocation complex.

The disclosure also provides a method of protecting cells from oxidative stress, hypoxia, proteotoxicity, genotoxic insults or damage and/or lipotoxicity in a subject in need thereof comprising administering to the subject any of the compounds disclosed herein, or a combination of a compound of Formula I, in an amount effective to protect cells from oxidative stress, hypoxia proteotoxicity, genotoxic insults or damage, and/or lipotoxicity. The subject can have, for example, one or more of the chronic conditions that have been associated with increased oxidative stress and oxidation and a background of propensity to proteotoxicity. The cells being protected can comprise, for example, cardiac cells, kidney and liver cells, neurons and glia, myocytes, fibroblasts and/or immune cells. The compound can, for example, selectively activate chaperone-mediated autophagy (CMA). In one embodiment, the compound does not affect macroautophagy.

In an embodiment the subject is a mammal. In certain embodiments the subject is a human, for example a human patient undergoing medical treatment. The subject may also be a companion a non-human mammal, such as a companion animal, e.g. cats and dogs, or a livestock animal.

For diagnostic or research applications, a wide variety of mammals will be suitable subjects including rodents (e.g. mice, rats, hamsters), rabbits, primates, and swine such as inbred pigs and the like. Additionally, for in vitro applications, such as in vitro diagnostic and research applications, body fluids (e.g., blood, plasma, serum, cellular interstitial fluid, cerebrospinal fluid, saliva, feces and urine) and cell and tissue samples of the above subjects will be suitable for use.

An effective amount of a pharmaceutical composition may be an amount sufficient to inhibit the progression of a disease or disorder, cause a regression of a disease or disorder, reduce symptoms of a disease or disorder, or significantly alter a level of a marker of a disease or disorder. For example levels of dopamine transporter (DAT) and vesicular monoamine transporter 2 (VMAT2) are both reduced in the brains of Parkinson's sufferers in the prodromal phase and at diagnosis and are may also be used to monitor disease progression by brain imaging. Thus a therapeutically effective amount of a compound of Formula I includes an amount effect to slow the decrease in brain DAT or VMAT2 levels as observed by brain imaging. Accumulation of Tau protein in brains of frontotemporal dementia patients has been observed by PET imaging, thus a therapeutically effective amount of a compound of Formula I includes and amount sufficient to decrease tau brain deposits or slow the rate of tau brain deposition. Markers for effective treatment of NASH, hepatosteatosis, and alcoholic fatty liver include reduced lipid content and fibrosis in liver biopsy. Markers for effective treatment of cancer include reduced tumor size, for example as observed by MRI, reduced number or size of metastasis. Markers for effective treatment of emphysema include improved volumetric and speed parameters in spirometry. Markers for effective treatment of immunosenescense include recover T cell activation in vitro. Markers for effective treatment of kidney malfunction include normalization of plasma creatine levels and plasma to urine creatine ratio.

An effective amount of a compound or pharmaceutical composition described herein will also provide a sufficient concentration of a compound of Formula I when administered to a subject. A sufficient concentration is a concentration of the compound of Formula I in the patient's body necessary to prevent or combat a CMA mediated disease or disorder or other disease ore disorder for which a compound of Formula I is effective. Such an amount may be ascertained experimentally, for example by assaying blood concentration of the compound, or theoretically, by calculating bioavailability.

Methods of treatment include providing certain dosage amounts of a compound of Formula I to a subject or patient. Dosage levels of each compound of from about 0.1 mg to about 140 mg per kilogram of body weight per day are useful in the treatment of the above-indicated conditions (about 0.5 mg to about 7 g per patient per day). The amount of compound that may be combined with the carrier materials to produce a single dosage form will vary depending upon the patient treated and the particular mode of administration. Dosage unit forms will generally contain between from about 1 mg to about 500 mg of each active compound. In certain embodiments 25 mg to 500 mg, or 25 mg to 200 mg of a compound of Formula I are provided daily to a patient. Frequency of dosage may also vary depending on the compound used and the particular disease treated. However, for treatment of most diseases and disorders, a dosage regimen of 4 times daily or less can be used and in certain embodiments a dosage regimen of 1 or 2 times daily is used.

It will be understood, however, that the specific dose level for any particular patient will depend upon a variety of factors including the activity of the specific compound employed, the age, body weight, general health, sex, diet, time of administration, route of administration, and rate of excretion, drug combination and the severity of the particular disease undergoing therapy.

In an embodiment, the invention provides a method of treating a lysosomal storage disorder in a patient identified as in need of such treatment, the method comprising providing to the patient an effective amount of a compound of Formula I. The compounds of Formula I provided herein may be administered alone as the only active agent, or in combination with one or more other active agent.

EXAMPLES

General Methods

Examples 1-14 provide detailed synthetic methods for representative compounds. Remaining compounds of this disclosure can be made by these methods using changes in starting materials and reaction conditions that will be readily apparent to those of ordinary skill in the art of organic chemistry synthesis. Unless otherwise specified all starting materials are commercially available reagent grade compounds. $^1$H spectra were obtained on a Bruker 400 MHz NMR spectrometer in $CDCl_3$ or DMSO.

The LCMS data was obtained on a SHIMADZU LCMS-2020 equipped with LabSolution Version 5.89. The stationary phase was a Kinetex EVO C18 30×2.1 mm, 5 μm column (50° C.). The mobile phase was a mixture of Solvent A (0.0375% TFA in water (v/v)) and Solvent B (0.01875% TFA in Acetonitrile (v/v)), with a flowrate of 1.5 mL/min. The solvent gradient was as follows: 5% B (0 min); 95% B (0.8 min); 95% B (1.20 min); 5% B (1.21 min); and 5% B (1.55 min).

HPLC purification was carried out using a SHIMADZU LC-20AB equipped with LabSolution Version 5.87 SP1 software. The stationary phase was a Kinetex C18 4.6×50 mm, 5 μm column (50° C.). The mobile phase was a mixture of Solvent A (0.0375% TFA in water (v/v)) and Solvent B (0.01875% TFA in Acetonitrile (v/v)), with a flowrate of 1.5 mL/min. The solvent gradient was as follows: 10% B (0 min); 80% B (4.20 min); 80% B (5.30 min); 10% B (5.31 min); 10% B (6.00 min).

Abbreviations

The following abbreviations are used in the examples and throughout the specification.
DCM Dichloromethane
DIPEA N,N-Diisopropylethylamine
EtOAc Ethyl Acetate
HPLC High performance liquid chromatography
LCMS Liquid Chromatography Mass Spectrometry
MTBE Methyl tert-butyl ether
NMR Nuclear Magnetic Resonance
PPA Phenylpropanolamine
RT Room Temperature
TEA Triethanolamine
TFAA Trifluoroacetic acid
THF Tetrahydrofuran
TLC Thin Layer Chromatography Example 1. Synthesis of 2-([1,1'-biphenyl]-4-yl)-6-chlorobenzo[d]oxazole (Cmp. 1))

Compound 1 is prepared according to the following synthetic scheme. Additional compounds of Formula I can be made via the following synthetic scheme:

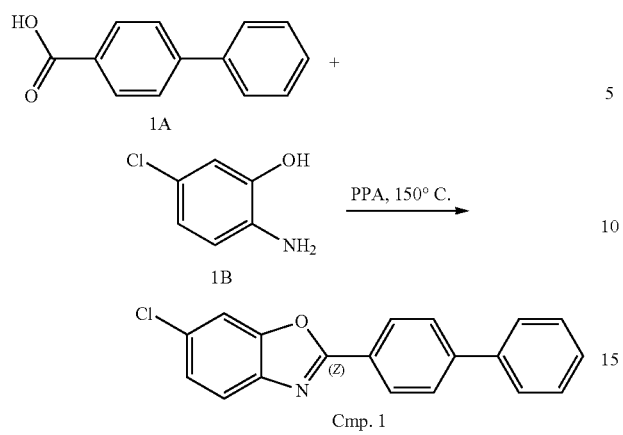

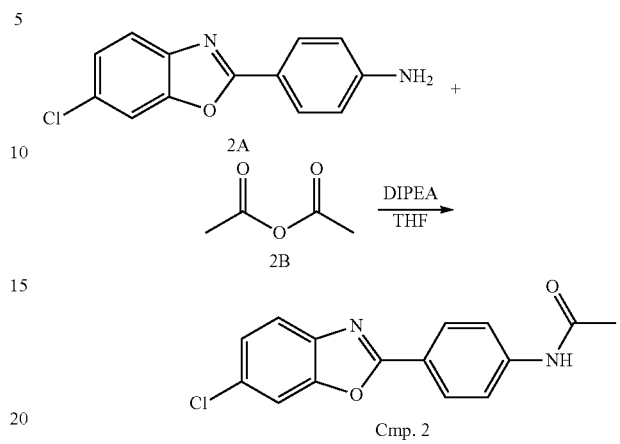

Example 2. Synthesis of N-(4-(6-chlorobenzo[d]oxazol-2-yl)phenyl)acetamide (Cmp. 2)

The mixture of compound 1A (1.0 g, 6.97 mmol) and compound 1B (1.38 g, 6.97 mmol) in PPA (10.0 mL) was heated to 150° C. and stirred for 0.5 h. LCMS showed compound 1B was consumed completely The reaction mixture was slowly added to saturated sodium bicarbonate solution (200 mL), then extracted with EtOAc (200 mL), the organic layer was washed with brine (200 mL), dried over $Na_2SO_4$, filtered and concentrated to afford the crude product. The crude product was purified by column chromatography ($SiO_2$, Petroleum ether/Ethyl acetate=10:1 to 5:1) to afford the purified product. Cmp. 1 (300 mg, 954 μmol, purity: 97.1%) was obtained as red solid.

LCMS: product: RT=1.174 min, m/z=306.2 (M+H$^+$). HPLC: product: RT=4.599 min. purity: 97.1%. $^1$H NMR: (400 MHz, DMSO) δ=8.28 (d, J=8.6 Hz, 2H), 8.03 (d, J=2.0 Hz, 1H), 7.95 (d, J=8.6 Hz, 2H), 7.85 (d, J=8.6 Hz, 1H), 7.83-7.78 (m, 2H), 7.56-7.45 (m, 4H).

Alternatively, Compound 1 can be prepared according to the following reaction scheme:

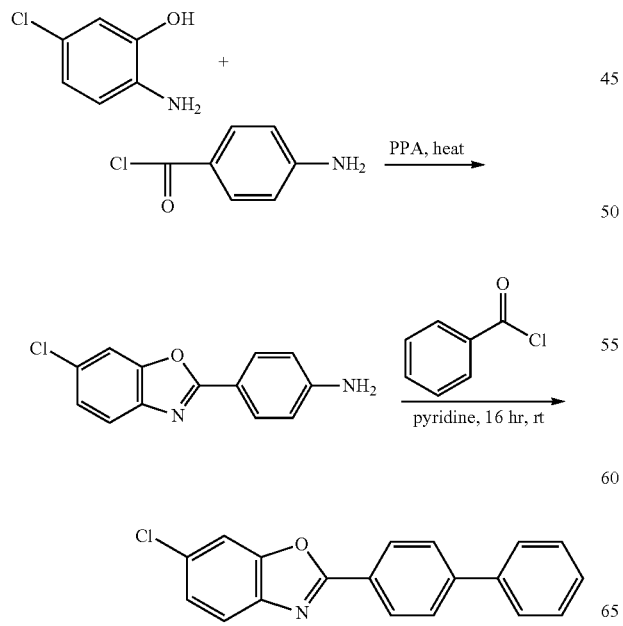

To a solution of compound 2A (500 mg, 2.04 mmol) in THF (10 mL) was added DIPEA (528 mg, 4.09 mmol) and acetyl acetate (250 mg, 2.45 mmol). The mixture was stirred at 25° C. for 0.5 hr. LCMS (EW14095-6-P1A) showed the reaction was completed and the desired compound MS was detected. The reaction mixture was diluted with $H_2O$ 50 mL and extracted with EtOAc (100 mL×3). The combined organic layers were washed with brine (30 mL×2), dried over $Na_2SO_4$, filtered and concentrated under reduced pressure to give a residue. The crude product was triturated with MTBE (10 mL) at 20° C. for 10 min. And then the mixture was filtered to give CA77.2 (307 mg, 1.07 mmol) as pink solid.

LCMS: product: RT=0.900 min, m/z=287.0 (M+H$^+$). HPLC: EW14267-1-P1A, product: RT=2.262 min. purity: 99.1%. $^1$H NMR: (400 MHz, DMSO) δ=10.32 (s, 1H), 8.10 (d, J=8.8 Hz, 2H), 7.92 (s, 1H), 7.81 (d, J=8.8 Hz, 2H), 7.76 (d, J=8.4 Hz, 1H), 7.43 (d, J=1.6 Hz, 1H), 2.10 (s, 3H).

Example 3. Synthesis of N-(4-(6-chlorobenzo[d]oxazol-2-yl)phenyl)-2,2,2-trifluoroacetamide (Cmp. 3)

Step 1. Synthesis of 4-(6-chlorobenzo[d]oxazol-2-yl)aniline

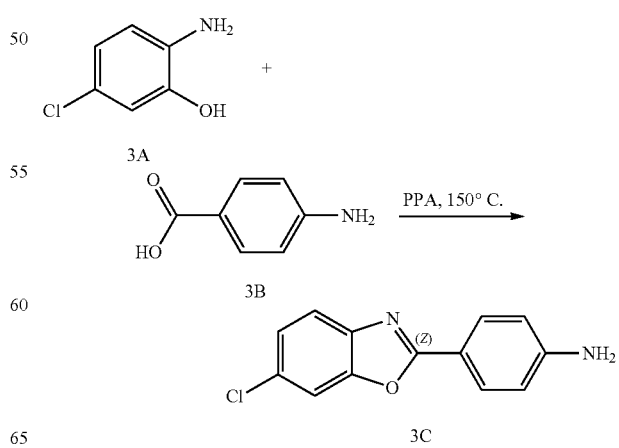

To a solution of compound 3A (5.00 g, 34.8 mmol) in PPA (30 mL) was added compound 3B (4.78 g, 34.8 mmol). The mixture was stirred at 150° C. for 0.5 hr. TLC (Petroleum ether:Ethyl acetate=2:1) showed the reaction was completed and a new main spot was formed, LCMS (EW12631-7-P1A) showed the reaction was completed and the desired compound MS was detected. The reaction mixture was diluted with H$_2$O 200 mL and the mixture's pH was adjusted to 8 with 2N·NaOH, then mixture was extracted with DCM (300 mL×3). The combined organic layers were washed with brine (100 mL×2), dried over Na$_2$SO$_4$, filtered and concentrated under reduced pressure to give a residue. The residue was purified by column chromatography (SiO$_2$, Petroleum ether/Ethyl acetate=50/1 to 10:1) to give compound 3C (4.50 g, 17.6 mmol) as red solid.

LCMS: product: RT=0.943 min, m/z=244.9 (M+H$^+$). $^1$H NMR: (400 MHz, DMSO) δ=7.86-7.84 (m, 3H), 7.66 (d, J=8.0 Hz, 1H), 7.39-7.36 (m, 1H), 7.60 (d, J=8.0 Hz, 1H), 6.05 (s, 1H)

Step 2. Synthesis of N-(4-(6-chlorobenzo[d]oxazol-2-yl)phenyl)-2,2,2-trifluoroacetamide (Cmp. 3) P

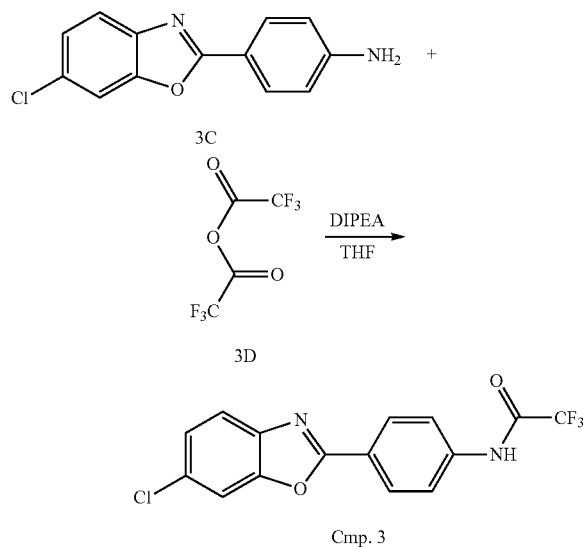

Cmp. 3

To a solution of compound 3C (0.50 g, 2.04 mmol) in THF (10 mL) was added DIPEA (527 mg, 4.08 mmol) and compound 3D (514 mg, 2.45 mmol). The mixture was stirred at 25° C. for 0.5 hr. LCMS showed the reaction was completed and the desired compound MS was detected. The reaction mixture was diluted with H$_2$O (50 mL) and extracted with EtOAc (100 mL×3). The combined organic layers were washed with brine (30 mL×2), dried over Na$_2$SO$_4$, filtered and concentrated under reduced pressure to give a residue. The crude product was triturated with MTBE (10 mL) at 20° C. for 10 min. And then the mixture was filtered to give the final compound Cmp. 3 (304 mg, 857 μmol, 42.0% yield) as brown solid.

LCMS: product: RT=0.997 min, m/z=340.9 (M+H$^+$). HPLC: product: RT=2.592 min. purity: 95.3%. $^1$H NMR: (400 MHz, DMSO) δ=11.58 (s, 1H) 8.23-8.20 (m, 2H), 7.98-7.95 (m, 1H), 7.94-7.93 (m, 2H) 7.82-7.80 (m, 1H), 7.47-7.45 (m, 1H).

Example 4. Synthesis of N-(4-(6-chlorobenzo[d]oxazol-2-yl)phenyl)isobutyramide (Cmp. 4)

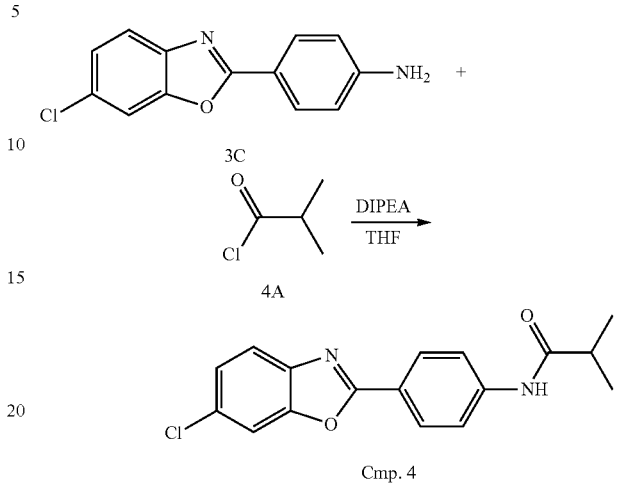

Cmp. 4

To a solution of compound 3C (500 mg, 2.04 mmol) in THF (10 mL) is added DIPEA (527 mg, 4.08 mmol) and compound 4A (191 mg, 2.04 mmol). The mixture is stirred at 25° C. for 0.5 hr. LCMS is used to show reaction completion and expected product. The reaction mixture is diluted with H$_2$O (50 mL) and extracted with EtOAc (100 mL×3). The combined organic layers are washed with brine (50 mL×2), dried over Na$_2$SO$_4$, filtered and concentrated under reduced pressure to give a residue. The crude product is triturated with petroleum ether at 25° C. for 10 min. and filtered to give compound 4.

Example 5. Synthesis of N-(4-(6-chlorobenzo[d]oxazol-2-yl)phenyl)-3-methylbutanamide (Cmp. 5)

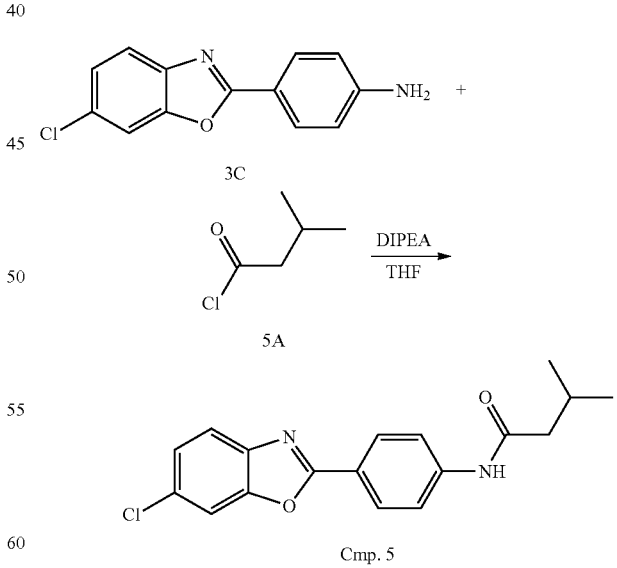

Cmp. 5

To a solution of compound 3C (500 mg, 2.04 mmol) in THF (10 mL) was added DIPEA (527 mg, 4.08 mmol) and compound 2C (246 mg, 2.04 mmol). The mixture was stirred at 25° C. for 0.5 hr. LCMS showed the reaction was completed and the desired compound MS was detected. The reaction mixture was diluted with H$_2$O (50 mL) and extracted with EtOAc (100 mL×3). The combined organic layers were washed with brine (50 mL×2), dried over Na$_2$SO$_4$, filtered and concentrated under reduced pressure to give a residue. The crude product was triturated with petroleum ether at 25° C. for 10 min. And the mixture was filtered to give the final compound (Cmp. 5) (288 mg, 878 μmol) as light brown solid.

LCMS: product: RT=1.052 min, m/z=329.0 (M+H$^+$). HPLC: product: RT=3.673 min. purity: 99.4%. $^1$H NMR: (400 MHz, CDCl$_3$) δ=8.19 (d, J=8.8 Hz 1H), 7.72 (d, J=8.4 Hz 1H), 7.65 (d, J=8.4 Hz 1H), 7.98-7.95 (m, 1H), 7.94-7.93 (m, 2H) 7.82-7.80 (m, 1H), 7.47-7.45 (m, 1H).

Example 6. Synthesis of N-(4-(6-chlorobenzo[d]oxazol-2-yl)phenyl)-4-fluorobenzamide (Cmp. 6)

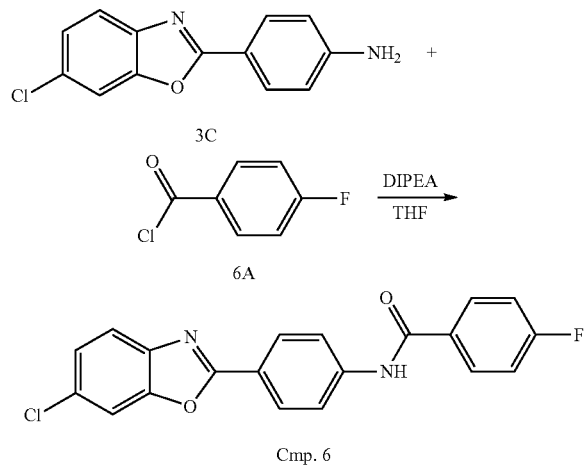

To a solution of compound 7 (400 mg, 1.63 mmol) in THF (10 mL) was added DIPEA (422 mg, 3.27 mmol) and compound 2F (311 mg, 1.96 mmol). The mixture was stirred at 25° C. for 0.5 hr. LCMS showed the reaction was completed and the desired compound MS was detected. The reaction mixture was diluted with H$_2$O (50 mL) and extracted with EtOAc (100 mL×3). The combined organic layers were washed with brine (30 mL×2), dried over Na$_2$SO$_4$, filtered and concentrated under reduced pressure to give a residue. The crude product was triturated with MTBE (10 mL) at 20° C. for 10 min. And then the mixture was filtered to give the final compound (Cmp. 6) (280 mg, 724 μmol) as gray solid LCMS: product: RT=1.020 min, m/z=367.0 (M+H$^+$). HPLC: product: RT=2.678 min. purity: 94.9%. $^1$H NMR: (400 MHz, DMSO) δ=10.69 (s, 1H), 8.18-8.16 (m, 2H), 8.10-8.05 (m, 4H), 7.96 (s, 1H), 7.79 (d, J=8.4 Hz 1H), 7.41-7.39 (m, 3H).

Example 7. Synthesis of N-(4-(6-chlorobenzo[d]oxazol-2-yl)phenyl)-4-fluorobenzenesulfonamide (Cmp. 7)

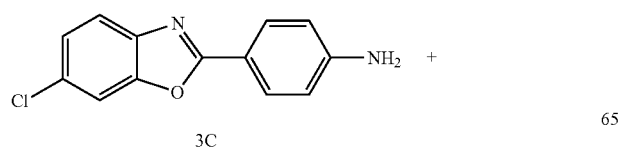

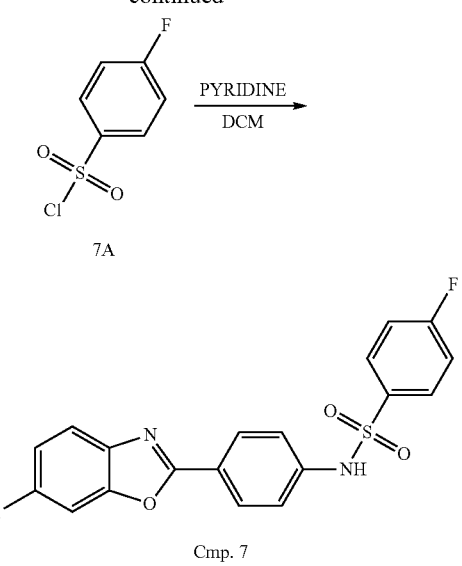

To a solution of compound 3C (300 mg, 1.23 mmol) in DCM (4 mL) was added pyridine (194 mg, 2.45 mmol) and compound 7A (286 mg, 1.47 mmol). The mixture was stirred at 25° C. for 0.5 hr. LCMS (EW14095-8-P1A) showed the reaction was completed and the desired compound MS was detected. The reaction mixture was diluted with H$_2$O (50 mL) and extracted with EtOAc (100 mL×3). The combined organic layers were washed with brine (30 mL×2), dried over Na$_2$SO$_4$, filtered and concentrated under reduced pressure to give a residue. The crude product was triturated with MTBE (10 mL) at 20° C. for 10 min. And then the mixture was filtered to give the final compound (Cmp. 7) (295 mg, 706 μmol) as red solid.

LCMS: product: RT=1.004 min, m/z=402.9 (M+H$^+$). HPLC: product: RT=2.678 min. purity: 96.5%. $^1$H NMR: (400 MHz, DMSO) δ=10.92 (s, 1H), 8.05 (d, J=8.8 Hz, 2H), 7.92-7.91 (m, 3H), 7.75 (d, J=8.4 Hz, 1H), 7.43-7.34 (m, 3H), 7.33 (d, J=8.8 Hz 2H).

Example 8. Synthesis of N-(4-(6-chlorobenzo[d]oxazol-2-yl)phenyl)-1,1,1-trifluoromethanesulfonamide (Cmp. 8)

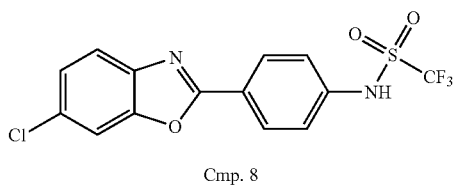

Cmp. 8

A solution of compound 3C (700 mg, 2.86 mmol) in THF (10 mL) was cooled to −78° C. then TEA (579 mg, 5.72 mmol) added into the mixture, then and compound 8A (1.21 g, 4.29 mmol) was drop wised into the mixture. The mixture was stirred at −78° C. for 0.5 hr. The reaction mixture was diluted with H₂O (50 mL) and extracted with DCM (50 mL×3). The combined organic layers were washed with brine (30 mL×2), dried over Na₂SO₄, filtered and concentrated under reduced pressure to give a residue. The residue was purified by prep-HPLC (ACSWH-GX-M, Waters Xbridge 150×25 mm, 5 μm (0.05% ammonia hydroxide v/v)-ACN) to give the final compound (Cmp. 8)((225 mg, 597 μmol) as gray solid.

LCMS product: RT=0.827 min, m/z=377.0 (M+H⁺). HPLC: product: RT=1.901 min. purity: 99.6%. ¹H NMR: (400 MHz, DMSO) δ=8.21-8.19 (m, 2H), 7.98 (s, 1H), 7.81 (d, J=8.4 Hz, 1H), 7.49-7.44 (m, 3H).

Example 9. 6-chloro-2-(4'-fluoro-[1,1'-biphenyl]-4-yl)benzo[d]oxazole (Cmp. 9)

Compound 9 is prepared by the methods set forth in Example 1.

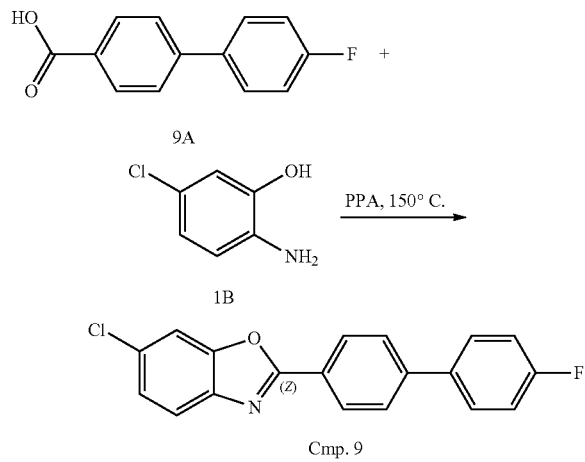

Cmp. 9

The mixture of compound 9A (6.97 mmol) and compound 1B (1.38 g, 6.97 mmol) in PPA (10.0 mL) are heated to 150° C. and stirred for 0.5 h. The reaction mixture is slowly added to saturated sodium bicarbonate solution (200 mL), then extracted with EtOAc (200 mL), the organic layer is washed with brine (200 mL), dried over Na₂SO₄, filtered and concentrated to afford the crude product. The crude product is purified by column chromatography (SiO2, Petroleum ether/Ethyl acetate=10:1 to 5:1) to afford the purified product, Compound 9.

Example 10. Synthesis of 6-chloro-2-(4'-trifluoromethyl-[1,1'-biphenyl]-4-yl)benzo[d]oxazole (Cmp. 10)

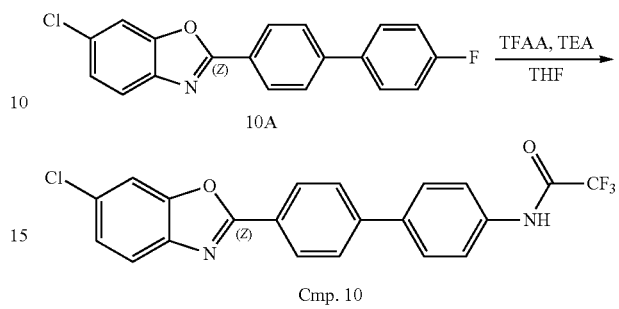

Cmp. 10

To the solution of compound 10A (400 mg, 1.25 mmol) and TEA (378 mg, 3.74 mmol) in THF (5.00 mL) was added TFAA (393 mg, 1.87 mmol) at 0° C., then stirred at 0° C. for 0.5 h. LCMS showed compound 11 was consumed completely. The reaction mixture was quenched with water (20.0 mL), then extracted with EtOAc (20.0 mL), the organic layer was washed with brine (20.0 mL), dried over Na₂SO₄, filtered and concentrated to afford the crude product. The crude product was triturated with Petroleum ether (10.0 mL) at 25 C for 10 min. Then filtered to afford Cmp. 10 (257 mg, purity: 99.4%, yield: 49.13%) as a red solid.

LCMS: product: RT=1.140 min, m/z=416.9 (M+H⁺). HPLC: product: RT=3.938 min. purity: 99.4%. ¹H NMR: (400 MHz, DMSO) δ=11.41 (s, 1H), 8.26 (d, J=8.3 Hz, 2H), 8.02 (d, J=2.0 Hz, 1H), 7.96 (d, J=8.4 Hz, 2H), 7.91-7.75 (m, 5H), 7.48 (dd, J=2.0, 8.4 Hz, 1H).

Example 11. Synthesis of 6-chloro-2-(4'-trifluoromethyl-[1,1'-biphenyl]-4-yl)benzo[d]oxazole (Cmp. 11)

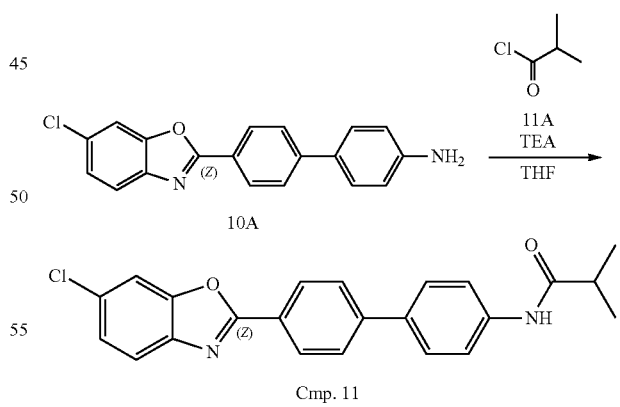

Cmp. 11

To the solution of compound 10A (300 mg, 935 μmol) and TEA (283 mg, 2.81 mmol) in THF (5 mL) was added compound 11A (149 mg, 1.40 mmol) at 0° C., the reaction mixture was stirred at 0° C. for 0.5 h. LCMS showed compound 11 was consumed completely. The reaction mixture was filtered to afford the crude product as pink solid. The crude product was triturated with 0.5 N HCl(aq) (50.0 mL) at 25° C. for 30 min to remove the TEA, then filtered to afford the purified product. Compound 11 (275 mg, purity: 99.4%, yield: 74.81%) was obtained as pink solid.

LCMS: product: RT=1.117 min, m/z=391.2 (M+H+). HPLC: product: RT=3.834 min. purity: 99.4%. ¹H NMR: (400 MHz, DMSO) δ=9.99 (s, 1H), 8.24 (br d, J=8.1 Hz, 2H), 8.02 (s, 1H), 7.92 (br d, J=8.1 Hz, 2H), 7.84 (br d, J=8.4 Hz, 1H), 7.76 (s, 4H), 7.48 (br d, J=8.4 Hz, 1H), 2.82-2.61 (m, 1H), 1.13 (br d, J=6.7 Hz, 7H).

Example 12. Synthesis of N-(4'-(6-chlorobenzo[d]oxazol-2-yl)-[1,1'-biphenyl]-4-yl)-3-methylbutanamide (Cmp. 12)

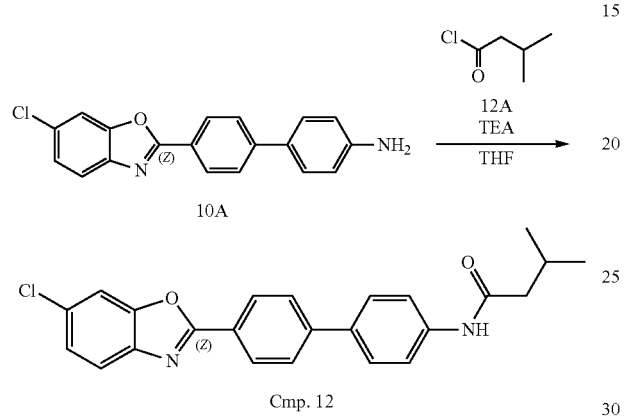

To the solution of compound 10A (300 mg, 935 μmol) and TEA (283 mg, 2.81 mmol) in THF (5 mL) is added compound 12A (167 mg, 1.40 mmol) at 0° C., the reaction mixture is stirred at 0° C. for 0.5 h. LCMS showed compound 11 is consumed completely. The reaction mixture is filtered to afford the crude product. The crude product is triturated with 0.5 N HCl (aq) (50.0 mL) at 25° C. for 30 min to remove the TEA, then filtered to afford the purified product.

Example 13. Synthesis of N-(4-(5-chlorobenzo[d]oxazol-2-yl)phenyl)-2,2,2-trifluoroacetamide (Cmp. 13)

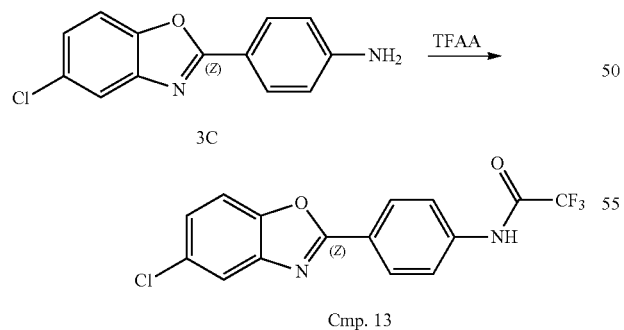

To the solution of compound 3C (500 mg, 2.04 mmol) and TEA (620 mg, 6.13 mmol) in THF (10.0 mL) was added TFAA (643 mg, 3.07 mmol) at 0° C., the mixture was warmed 25° C. and stirred for 1 h. LCMS showed compound 3 was consumed completely. The mixture was poured into ice water (10.0 mL), then extracted with EtOAc (20.0 mL), the organic layer was washed with brine (20.0 mL), dried over Na₂SO₄, filtered and concentrated to afford the crude product. The crude product was triturated with Petroleum ether at 25 C for 30 min, then filtered to afford the purified product as pink solid. Compound 13 (351 mg, purity: 99.9%) was obtained as off-white solid.

LCMS: product: RT=1.042 min, m/z=341.1 (M+H+). HPLC: product: RT=3.732 min. purity: 99.9%. ¹H NMR: (400 MHz, DMSO) δ=11.61 (br s, 1H), 8.33-8.22 (m, 2H), 8.03-7.91 (m, 3H), 7.83 (d, J=8.7 Hz, 1H), 7.47 (dd, J=2.2, 8.7 Hz, 1H)

Example 14. Synthesis of N-(4'-(5-chlorobenzo[d]oxazol-2-yl)-[1,1'-biphenyl]-4-yl)-2,2,2-trifluoroacetamide (Cmp. 14)

Step. 1 Synthesis of 2-(4-bromophenyl)-5-chlorobenzo[d]oxazole

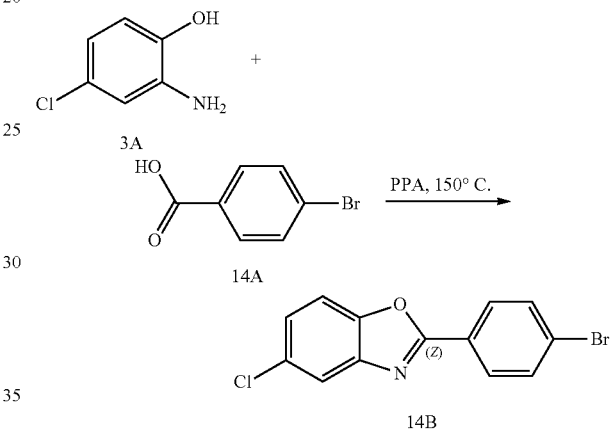

The mixture of compound 14A (2.50 g, 12.4 mmol) and compound 3A (1.79 g, 12.4 mmol) in PPA (20.0 mL) was heated to 150° C. and stirred for 1 h. LC-MS showed compound 3A was consumed completely. The reaction mixture was quenched with NaHCO₃ (aq) (500 mL), extracted with EtOAc (200 mL), the organic layer was washed with brine (500 mL), dried over Na₂SO₄, filtered and concentrated to afford the crude product. The crude product was used in next step without further purification. Compound 14B (1.50 g, 4.58 mmol, purity: 94.3%, yield: 36.8%) was obtained as red solid.

LCMS: product: RT=1.123 min, m/z=309.8 (M+H+).

Step 2. Synthesis of 4'-(5-chlorobenzo[d]oxazol-2-yl)-[1,1'-biphenyl]-4-amine

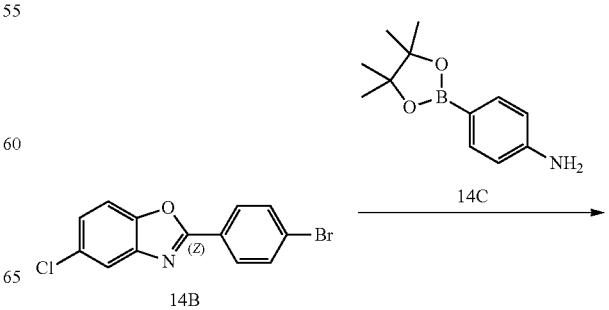

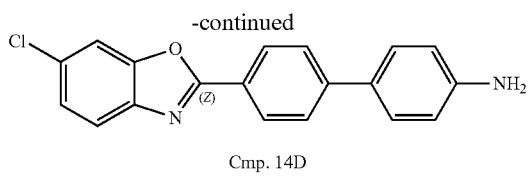

Cmp. 14D

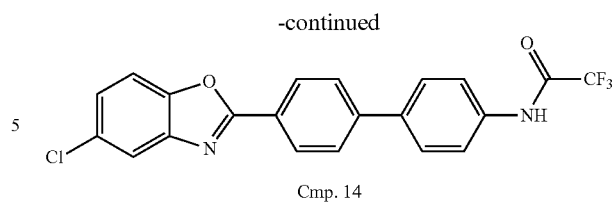

Cmp. 14

To the solution of compound 14B (1.30 g, 4.21 mmol), compound 14C (1.11 g, 5.06 mmol) and K$_2$CO$_3$ (1.75 g, 12.64 mmol) in dioxane (15.0 mL) and H$_2$O (3.00 mL) was added Pd(dppf)Cl$_2$ (308 mg, 421 μmol), the reaction mixture was heated to 120° C. and stirred for 2 hr. LCMS showed compound 14B was consumed completely. The reaction mixture was poured into water (100 mL), extracted with EtOAc (100 mL), the organic layer was washed with brine (200 mL), dried over Na$_2$SO$_4$, filtered and concentrated to afford the crude product. The crude product was purified by chromatography on a silica gel eluted with petroleum ether:ethyl acetate (from 10:1 to 5:1) to give the pure product. Compound 14D (690 mg, 2.07 mmol, 49.15% yield, 96.27% purity) was obtained as yellow solid.

LCMS: product: RT=0.955 min, m/z=320.9 (M+H$^+$).

Step 3. Synthesis of N-(4'-(5-chlorobenzo[d]oxazol-2-yl)-[1,1'-biphenyl]-4-yl)-2,2,2-trifluoroacetamide

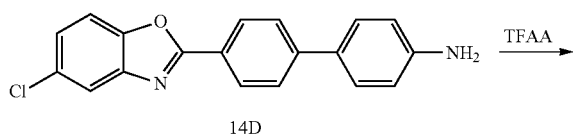

To the solution of compound 14D (500 mg, 1.56 mmol) and TEA (473 mg, 4.68 mmol) in THF (5.00 mL) was added TFAA (491 mg, 2.34 mmol) at 0° C., then stirred at 0° C. for 1 h. TLC (Petroleum ether:Ethyl acetate=3:1, R$_f$=0.5) showed compound 14D was consumed completely and one new spot formed. The reaction mixture was quenched with water (100 mL), and extracted with EtOAc (100 mL), the organic layer was washed with brine (100 mL), dried over Na$_2$SO$_4$, filtered and concentrated to afford the crude product. The crude product was triturated with Petroleum ether (10.0 mL) at 25 C for 10 min, then filtered to afford compound 14 (289 mg, 682 μmol, 43.8% yield, 98.4% purity) as orange solid.

LCMS: product: RT=1.138 min m/z=416.9 (M+H$^+$). HPLC: product: RT=3.934 min. purity: 98.4%. $^1$H NMR: (400 MHz, DMSO).

Example 15. Additional Compounds

The disclosure provide additional compounds of Formula I that can be prepared by the methods illustrated in examples 1-14 using routine variations in starting materials and reaction conditions that are readily apparent to a chemist of ordinary skill.

TABLE 1

| Cmp. # | Structure | Name |
|---|---|---|
| 15 | 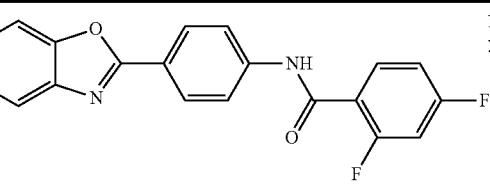 | N-(4-(6-chlorobenzo[d]oxazol-2-yl)phenyl)-2,4-difluorobenzamide |
| 16 | 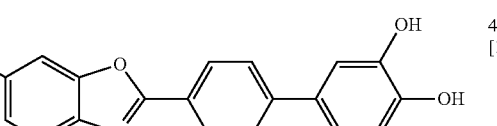 | 4'-(6-chlorobenzo[d]oxazol-2-yl)-[1,1-bipheny]-3,4-diol |
| 17 | 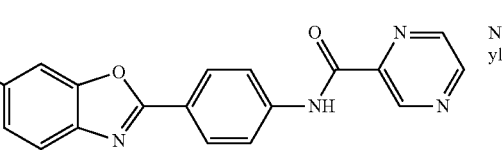 | N-(4-(6-chlorobenzo[d]oxazol-2-yl)phenyl)pyrazine-2-carboxamide |
| 18 | 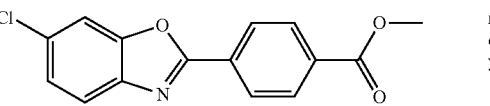 | methyl 4-(6-chlorobenzo[d]oxazol-2-yl)benzoate |
| 19 | 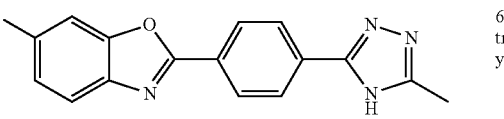 | 6-chloro-2-(4-(5-methyl-4H-1,2,4-triazol-3-yl)phenyl)benzo[d]oxazole |

TABLE 1-continued

| Cmp. # | Structure | Name |
|---|---|---|
| 20 | | cyclopropyl 4-(6-chlorobenzo[d]oxazol-2-yl)benzoate |
| 21 | | 5-(4-(6-chlorobenzo[d]oxazol-2-yl)phenyl)pyrazine-2,3-diol |
| 22 | | N-(5-(4-(6-chlorobenzo[d]oxazol-2-yl)phenyl)pyrazin-2-yl)-2,2,2-trifluoroacetamide |
| 23 | | N-(5-(4-(6-chlorobenzo[d]oxazol-2-yl)phenyl)pyrazin-2-yl)acetamide |
| 24 | | 4-(6-chlorobenzo[d]oxazol-2-yl)-N-(1,1,1-trifluoropropan-2-yl)aniline |
| 25 | | N-(4-(6-chlorobenzo[d]oxazol-2-yl)phenyl)cyclopropanecarboxamide |

Example 161. Measurement of CMA Activity In Vitro

The photoactivatable CMA reporter assay was constructed by inserting a sequence of 21 amino acid of Ribonuclease A bearing the CMA-targeting motif in the N-terminus multicloning site of the photoactivatable protein mCherry1 or the photoswitchable protein Dendra 2.

NIH 3T3 fibroblasts were stably transduced with a photoconvertible CMA reporter, KFERQ-Dendra and were photoswitched by exposure to a 3.5 MA (constant current) LED (Norlux, 405 nm) for 10 minutes and at the desired times fixed in 3% formaldehyde. Test cells are exposed to the indicated concentrations of the compounds, e.g. for 12 hours or 24 hours. Cells are imaged, e.g., by using high content microscopy (Operetta, Perkin Elmer) or by capturing images with an Axiovert 200 fluorescence microscope (Zeiss) with apotome and equipped with a 63×1.4 NA oil objective lens and red (ex. 570/30 nm, em. 615/30 nm), cyan (ex. 365/50 nm and em. 530/45 nm) and green (ex. 475/40 nm and em. 535/45 nm) filter sets (Chroma). Images were acquired with a high-resolution CCD camera after optical sectioning through the apotome. CMA activity is measured as the average number of fluorescent puncta (CMA active lysosomes) per cell. Values are expressed relative to values in untreated cells that were assigned an arbitrary value of 1 and are mean of >2,500 cells counted per condition. The S.D. in all instances was <0.01% mean value. Table 2 provides a comparison of Compound 1 and its comparative example Compound A and Compound 2 and its comparative example Compound B. Compounds 3, 5, 6, 7, 8, 10, 11, 13, and 14 were also tested in this assay and found to have a positive effect on the number of fluorescent puncta per cell.

TABLE 2

| Time | Cmp. A | Cmp. 1 | Cmp. B | Cmp. 2 |
|---|---|---|---|---|
| 0 | 1 | 1 | 1 | 1 |
| 5 | 2.457287 | 2.43 | 2.66694 | 2.72 |
| 10 | 2.619221 | 2.16 | 3.331226 | 2.63 |
| 20 | 3.586779 | 2.98 | 5.005261 | 3.40 |
| 30 | 4.373779 | 3.22 | 5.471211 | 5.12 |

Example 17. Pharmacokinetics

All animal work is approved and performed according to the guidelines set by the Albert Einstein College of Medicine Institutional Animal Care and Use Committee.

ICR (CD-1) male mice are fasted at least three hours and water was available ad libitum before the study. Animals are housed in a controlled environment, target conditions: temperature 18 to 29° C., relative humidity 30 to 70%. Temperature and relative humidity are monitored daily. An electronic time controlled lighting system was used to provide a 12 h light/12 h dark cycle. 3 mice for each indicated time point. ICR (CD-1) mice were administered compound at 1 mg/kg i.v. or 30 mg/kg p.o. Three (3) mice were included in each dosage and time group. Mice are sacrificed and plasma and brains are obtained, e.g. at 0.083, 0.25, 0.50, 1.0, 2.0, 4.0, 8.0, and 24.0 hours after administration and drug concentration determined using LC-MS/MS. Brains are removed, homogenized with a tissue homogenizer in cold 5% w/v BSA in phosphate buffer saline (PBS). A 100 microliter aliquots of brain samples are dispensed in to glass culture tubes and mixed with ethyl acetate (800 µl), vortexed, and centrifuged. The organic layer is transferred to a fresh culture tube, dried under nitrogen, and reconstituted in mobile phase for quantitation. Pharmacokinetic parameters are determined by standard methods using Phoenix WinNonlin 6.3 software.

Example 18. Metabolic Stability in Human, Rat, and Mouse Microsomes

Microsome stability is determined in human, rat, and mouse, liver microsomes.

Compound at 3 µM final concentration along with 0.5 mg/mL microsome protein and 1 mM NADPH was incubated for 0, 5, 15, 30 and 60 min. As a negative control, test compound is incubated with microsomes in the absence of NADPH. Samples are quenched with methanol and centrifuged for 25 min at 2500 rpm to precipitate proteins. Supernatants are analyzed (N=3) by LC-MS./MS. The ln peak area ratio (compound peak area/internal standard peak area) is plotted against time and the gradient of the line determined the elimination rate constant [k=(-1)(slope)]. The half-life ($t_{1/2}$ in minutes), incubation volume (V in µL/mg protein) and the in vitro intrinsic clearance ($CL_{int}$ in µL/min/mg protein) are calculated according to the following equations:

$$\text{Half-life}(t_{1/2})(\min) = 0.693/k \quad (1)$$

$$V \text{ (µL/mg)} = \text{volume of incubation (µL)/protein in the incubation (mg)} \quad (2)$$

$$\text{Intrinsic Clearance}(CL_{int})(\text{µL/min/mg protein}) = V * 0.693/t_{1/2} \quad (3)$$

Table 3 provides a comparison of the stability of Compound A and Compound 1 in human microsomes. Testosterone, diclofenac, and propafenone are provided as controls. $R^2$ is the correlation coefficient of the linear regression for the determination of kinetic constant. $T_{1/2}$ is the half life and $CL_{int\ (mic)}$ is the intrinsic clearance. $CL_{int(liver)} = CL_{int\ (mic)}*$mg microsomal protein/g liver weight*g liver weight/kg body weight. Liver weight/kg body weight is 20 g/kg for human.

TABLE 3

Metabolic Stability of Compound A and Compound 1 in Human Microsomes

| Sample | $R^2$ | $T_{1/2}$(min) | $CL_{int(mic)}$ (µL/min/kg) | $CL_{int(liver)}$ (mL/min/kg) | Remaining (T = 60 min) |
|---|---|---|---|---|---|
| Cmp. 1 | 0.7518 | >145 | <9.6 | <8.6 | 83.4% |
| Cmp. A | 0.9363 | 37.9 | 36.6 | 32.9 | 30.1% |
| Testosterone | 0.9983 | 13.5 | 102.8 | 92.5 | 4.6% |
| Diclofenac | 0.9973 | 15.7 | 88.0 | 79.2 | 6.8% |
| Propafenone | 0.9464 | 6.6 | 211.2 | 190.1 | 0.2% |

What is claimed is:
1. A compound of the Formula I

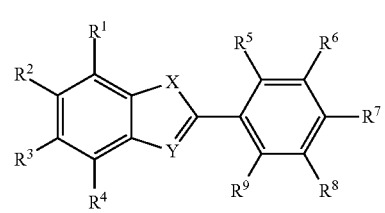

(I)

or a pharmaceutically acceptable salt thereof, wherein
X is O;
Y is N;
(i) $R^1$, $R^3$, and $R^4$ are all hydrogen and $R^2$ is chloro; or
(ii) $R^1$, $R^2$, and $R^4$ are all hydrogen and $R^3$ is chloro;
$R^5$, $R^6$, $R^8$, and $R^9$ are all hydrogen;
(a) $R^7$ is —$NR^{20}COR^{21}$, wherein $R^{20}$ is hydrogen, and $R^{21}$ is $C_1$-$C_2$haloalkyl when $R^2$ is chloro; and $R^{21}$ is $C_2$haloalkyl when $R^3$ is chloro;
(b) $R^7$ is —$NR^{20}SO_2R^{21}$, wherein $R^{20}$ is hydrogen, and $R^{21}$ is chosen from $C_1$-$C_2$haloalkyl and phenyl, which phenyl is optionally substituted with one or more halogens; or
(c) $R^7$ is a phenyl,
which is substituted with halogen, or one substituent —$N(R^{20})COR^{21}$, wherein $R^{21}$ is chosen from $C_1$-$C_6$alkyl, and $C_1$-$C_2$haloalkyl.

2. The compound or salt of claim 1, wherein $R^1$, $R^3$, and $R^4$ are all hydrogen and $R^2$ is chloro.

3. The compound or salt of claim 1, wherein $R^1$, $R^2$, and $R^4$ are all hydrogen and $R^3$ is chloro.

4. The compound or salt of claim 1, where $R^7$ is —$NR^{20}COR^{21}$ or —$NR^{20}SO_2R^{21}$.

5. A compound or salt of claim 1, where
$R^7$ is —$NR^{20}COR^{21}$ or $NR^{20}SO_2R^{21}$;
$R^{20}$ is hydrogen; and
$R^{21}$ is $CF_3$.

6. The compound or salt of claim 1, where $R^7$ is a phenyl, which is substituted with halogen.

7. The compound or salt of claim 1, wherein
$R^1$, $R^3$, $R^4$ $R^5$, $R^6$, $R^8$, and $R^9$ are hydrogen;
$R^2$ is chloro;
$R^{20}$ is hydrogen; and
$R^{21}$ is $CF_3$.

8. The compound or salt of claim 1, where
Y is N and X is O;
$R^1$, $R^3$, $R^4$ $R^5$, $R^6$, $R^8$, and $R^9$ are hydrogen;
$R^2$ is chloro; and
$R^7$ is phenyl, substituted with one or more halogen.

9. The compound or salt of claim 1, where
Y is N and X is O;
$R^1$, $R^3$, $R^4$ $R^5$, $R^6$, $R^8$, and $R^9$ are hydrogen;
$R^2$ is chloro;
$R^7$ is phenyl substituted with one substituent —$NR^{20}COR^{21}$;
$R^{20}$ is hydrogen; and
$R^{21}$ is chosen from $C_1$-$C_6$alkyl, or $C_1$-$C_2$haloalkyl.

10. The compound or salt of claim 1, where
Y is N and X is O;
$R^1$, $R^3$, $R^4$ $R^5$, $R^6$, $R^8$, and $R_9$ are hydrogen;
$R^2$ is chloro;
$R^7$ is —$NR^{20}COR^{21}$ or —$NR^{20}SO_2R^{21}$;
$R^{20}$ is hydrogen; and
$R^{21}$ is $C_1$-$C_2$haloalkyl.

11. A compound or pharmaceutically acceptable salt thereof, wherein the compound is
N-(4-(6-chlorobenzo[d]oxazol-2-yl)phenyl)-2,2,2-trifluoroacetamide;
N-(4-(6-chlorobenzo[d]oxazol-2-yl)phenyl)-4-fluorobenzamide;
N-(4-(6-chlorobenzo[d]oxazol-2-yl)phenyl)-4-fluorobenzenesulfonamide;
N-(4-(6-chlorobenzo[d]oxazol-2-yl)phenyl)-1,1,1-trifluoromethanesulfonamide;
6-Chloro-2-(4'-fluoro-[1,1'-biphenyl]-4-yl)benzo[d]oxazole;
6-chloro-2-(4'-trifluoromethyl-[1,1'-biphenyl]-4-yl)benzo[d]oxazole;
N-(4'-(5-chlorobenzo[d]oxazol-2-yl)-[1,1'-biphenyl]-4-yl)-2,2,2-trifluoroacetamide; or
N-(4-(6-chlorobenzo[d]oxazol-2-yl)phenyl)-2,4-difluorobenzamide.

12. The compound or salt thereof of claim 1, wherein the compound is

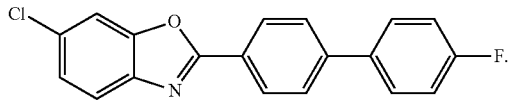 [SMILES: Fc1ccc(-c2ccc(-c3nc4ccc(Cl)cc4o3)cc2)cc1]

13. A pharmaceutical composition comprising a compound or salt of claim 1 together with a pharmaceutically acceptable carrier.

14. A method of selectively activating chaperone-mediated autophagy in a subject in need thereof, comprising administering an effective amount of a compound or a pharmaceutically acceptable salt of claim 1 to the subject.

15. The method of claim 14, wherein the subject has Parkinson's disease, Huntington's disease, Alzheimer's disease, frontotemporal dementia, prion diseases, amyotrophic lateral sclerosis, retinal and macular degeneration, Leber congenital amaurosis, diabetes, acute liver failure, NASH, hepatosteatosis, alcoholic fatty liver, renal failure and chronic kidney disease, emphysema, sporadic inclusion body myositis, spinal cord injury, traumatic brain injury, a lysosomal storage disorder, a cardiovascular disease, or immunosenescence.

16. A compound that is methyl 4-(6-chlorobenzo[d]oxazol-2-yl)benzoate.

17. A method of selectively activating chaperone-mediated autophagy in a subject in need thereof, comprising administering an effective amount of a compound of claim 16 to the subject.

18. The method of claim 17, wherein the subject has Parkinson's disease, Huntington's disease, Alzheimer's disease, frontotemporal dementia, prion diseases, amyotrophic lateral sclerosis, retinal and macular degeneration, Leber congenital amaurosis, diabetes, acute liver failure, NASH, hepatosteatosis, alcoholic fatty liver, renal failure and chronic kidney disease, emphysema, sporadic inclusion body myositis, spinal cord injury, traumatic brain injury, a lysosomal storage disorder, a cardiovascular disease, or immunosenescence.

* * * * *